(12) United States Patent
Fukutani

(10) Patent No.: US 10,075,096 B2
(45) Date of Patent: Sep. 11, 2018

(54) POWER SUPPLY SYSTEM

(71) Applicant: NIPPON STEEL & SUMITOMO METAL CORPORATION, Tokyo (JP)

(72) Inventor: Kazuhiko Fukutani, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/564,519

(22) PCT Filed: Mar. 29, 2017

(86) PCT No.: PCT/JP2017/012935
§ 371 (c)(1),
(2) Date: Oct. 5, 2017

(87) PCT Pub. No.: WO2017/203828
PCT Pub. Date: Nov. 30, 2017

(65) Prior Publication Data
US 2018/0212537 A1   Jul. 26, 2018

(30) Foreign Application Priority Data

May 24, 2016  (JP) .................................. 2016-103511

(51) Int. Cl.
| | | |
|---|---|---|
| H02M 7/5387 | (2007.01) |
| H05B 6/04 | (2006.01) |
| H02J 7/34 | (2006.01) |
| H05B 6/06 | (2006.01) |
| H02M 7/48 | (2007.01) |

(52) U.S. Cl.
CPC ......... *H02M 7/53871* (2013.01); *H02J 7/345* (2013.01); *H05B 6/04* (2013.01); *H05B 6/06* (2013.01); *H02M 2007/4815* (2013.01)

(58) Field of Classification Search
None
See application file for complete search history.

(56) References Cited

U.S. PATENT DOCUMENTS 6,091,210 A * 7/2000 Cavolina ................ H05B 41/28
315/224
2006/0221648 A1 * 10/2006 Liu .................... H02M 7/53871
363/17

(Continued)

FOREIGN PATENT DOCUMENTS

| JP | 3-169263 A | 7/1991 |
| JP | 2008-92745 A | 4/2008 |

(Continued)

OTHER PUBLICATIONS

International Search Report for PCT/JP2017/012935 (PCT/ISA/210) dated May 9, 2017.

(Continued)

*Primary Examiner* — Jeffrey Gblende
(74) *Attorney, Agent, or Firm* — Birch, Stewart, Kolasch & Birch, LLP

(57) ABSTRACT

A pseudo-resonant element (130) is disposed in series with respect to an inductive load (180) on the inductive load (180) side rather than an output end of an inverter unit (120) constituted of a magnetic energy recovery switch.

10 Claims, 14 Drawing Sheets

(56) References Cited

U.S. PATENT DOCUMENTS

| | | |
|---|---|---|
| 2010/0014333 A1 | 1/2010 | Shimada et al. |
| 2012/0037616 A1* | 2/2012 | Kitahara ............ H02M 7/53871 219/665 |
| 2012/0305547 A1 | 12/2012 | Fukutani et al. |
| 2015/0194909 A1* | 7/2015 | Pahlevaninezhad ......................... H02M 7/5387 363/132 |
| 2015/0280577 A1* | 10/2015 | Ohtake ................... H02M 1/08 363/21.02 |
| 2016/0100458 A1 | 4/2016 | Fukutani et al. |
| 2016/0100459 A1 | 4/2016 | Fukutani et al. |

FOREIGN PATENT DOCUMENTS

| | | |
|---|---|---|
| JP | 4460650 B1 | 5/2010 |
| JP | 2012-34522 A | 2/2012 |
| JP | 2012-125064 A | 6/2012 |
| WO | WO 2010/050486 A1 | 5/2010 |
| WO | WO 2011/074383 A1 | 6/2011 |

OTHER PUBLICATIONS

Written Opinion of the International Searching Authority for PCT/JP2017/012935 (PCT/ISA/237) dated May 9, 2017.

* cited by examiner

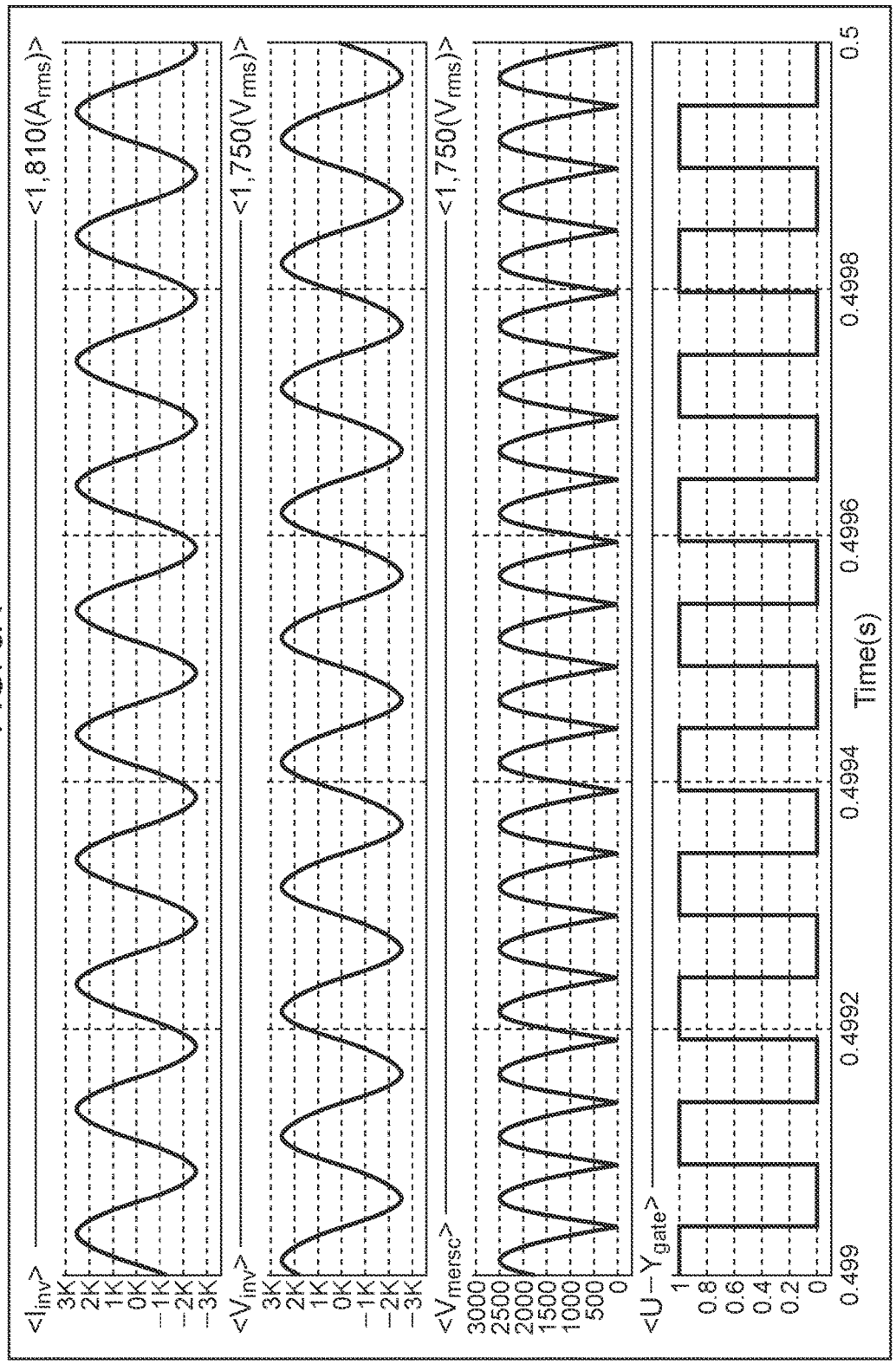

FIG. 7

| CIRCUIT SYSTEM | | MAGNETIC ENERGY RECOVERY SWITCH (COMPARATIVE EXAMPLE) | MAGNETIC ENERGY RECOVERY SWITCH +PSEUDO-RESONANT ELEMENT (INVENTION EXAMPLE) |
|---|---|---|---|
| FREQUENCY (kHz) | | | |
| 9.9 | $I_{inv}(A_{rms})$ | 1,810 | 1,810 |
| | $V_{inv}(V_{rms})$ | 2,710 | 1,750 |
| | $V_{mersc}(V_{rms})$ | 2,710 | 1,750 |
| | CAPACITANCE (kVA) | 4,905 | 3,170 |
| 7.0 | $I_{inv}(A_{rms})$ | 2,200 | 2,200 |
| | $V_{inv}(V_{rms})$ | 2,510 | 880 |
| | $V_{mersc}(V_{rms})$ | 2,510 | 880 |
| | CAPACITANCE (kVA) | 5,522 | 1,936 |

900

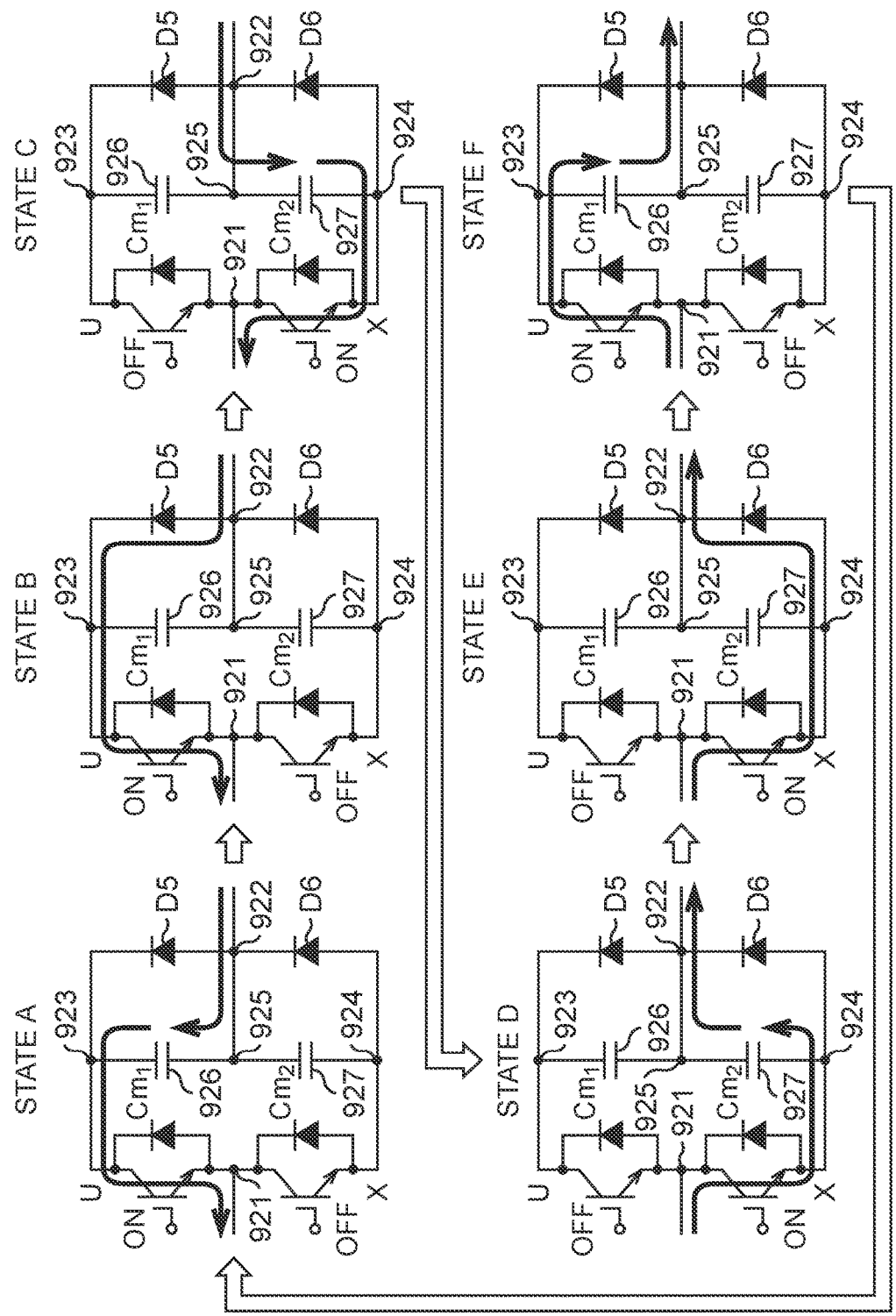

POWER SUPPLY SYSTEM

TECHNICAL FIELD

The present invention relates to a power supply system, and in particular is suitable for use for converting direct-current power into alternating-current power.

BACKGROUND ART

As a device which converts direct-current power into alternating-current power, there is a device using a magnetic energy recovery switch (refer to Patent Literature 1). The magnetic energy recovery switch mentioned in Patent Literature 1 has four switches and a capacitor. The four switches are connected so as to constitute a full-bridge circuit. The capacitor is connected between direct-current terminals of the full-bridge circuit. A load is connected between output terminals of the full-bridge circuit. The four switches each have a positive electrode terminal and a negative electrode terminal. A conduction state from the negative electrode terminal to the positive electrode terminal of the four switches is a state in which a current constantly flows. On the other hand, in a conduction state from the positive electrode terminal to the negative electrode terminal of the four switches, a state in which a current flows and a state in which a current does not flow are switched by a signal from the exterior. Such a magnetic energy recovery switch circuit allows a frequency of the alternating-current power converted from the direct-current power to be changed by changing a frequency at which on and off of the four switches are switched.

Further, Patent Literature 2 mentions that a capacitor improving a power factor on an input side of a magnetic energy recovery switch is provided on the input side of the magnetic energy recovery switch. Further, Patent Literature 2 mentions that a transformer is connected to both ends of a capacitor of the magnetic energy recovery switch and a capacitor is connected in series with the transformer and the capacitor of the magnetic energy recovery switch. This capacitor is the one for making an input voltage to the transformer large.

Further, Patent Literature 3 discloses that a DCDC converting device is constituted by using two magnetic energy recovery switches.

Further, Patent Literature 4 mentions that a capacitor is connected in parallel with an inductive load between alternating-current terminals of a magnetic energy recovery switch. Patent Literature 4 indicates that connecting the capacitor in parallel with the inductive load makes it possible to reduce a current flowing through the magnetic energy recovery switch.

CITATION LIST

Patent Literature

Patent Literature 1: International Publication Pamphlet No. WO 2011/74383

Patent Literature 2: Japanese Laid-open Patent Publication No. 2012-125064

Patent Literature 3: Japanese Laid-open Patent Publication No. 2012-34522

Patent Literature 4: Japanese Patent No. 4460650

SUMMARY OF INVENTION

Technical Problem

As a magnetic energy recovery switch as described above, various ones have been proposed. However, when the magnetic energy recovery switch is utilized as an inverter and alternating-current power is supplied to an inductive load, an impedance of the inductive load seen from an output side of the inverter is determined by reactance and resistance due to an inductance of the inductive load. Therefore, the magnetic energy recovery switch is required to supply reactive power in addition to effective electric power to the inductive load. Therefore, a power supply capacity (rated output power) of the magnetic energy recovery switch increases.

In the technique mentioned in Patent Literature 4, a reactance of the inductive load seen from an output side of an inverter (magnetic energy recovery switch) decreases. However, the technique mentioned in Patent Literature 4 aims to reduce a current flowing through the magnetic energy recovery switch. In order to achieve the aim, a capacitor is connected in parallel with an inductive load between alternating-current terminals of the magnetic energy recovery switch. In that case, a closed circuit is formed by the inductive load and the capacitor connected to the inductive load. When the magnetic energy recovery switch is operated in the above state, an oscillating current flows through the closed circuit. As a result, a current obtained by superimposing a current outputted from the magnetic energy recovery switch and the oscillating current flowing through the closed circuit on each other flows through the inductive load. Accordingly, an unexpected current flows through the inductive load. Therefore, it is impossible to stabilize the current flowing through the inductive load. Hence, addition of a circuit for suppressing the oscillating current flowing through the closed circuit is considered. However, the addition of such a circuit causes an increase in cost.

In the present invention, which has been made in consideration of the above-described problems, it is an object to achieve stabilization of a current to be transmitted to a load without using a specific device and a reduction in a power supply capacity of a magnetic energy recovery switch.

Solution to Problem

One example of a power supply system of the present invention is a power supply system including: a magnetic energy recovery switch; a frequency setting device; a control device; and a pseudo-resonant element, converting direct-current power into alternating-current power, and supplying the alternating-current power to an inductive load, wherein the magnetic energy recovery switch includes: one or a plurality of first capacitors; and a plurality of switches, wherein the frequency setting device sets an output frequency of the magnetic energy recovery switch, wherein the control device controls an on and off operation of the plurality of switches based on an output frequency set by the frequency setting device, wherein the magnetic energy recovery switch recoveries magnetic energy stored in the inductive load and stores the magnetic energy as electrostatic energy in the first capacitor, and supplies the stored electrostatic energy to the inductive load, by on and off of the plurality of switches, wherein the pseudo-resonant element is constituted of at least one passive element including a second capacitor, wherein the first capacitor is disposed in series with respect to the inductive load, wherein the second capacitor is connected in series with respect to the inductive load on the inductive load side rather than an output end of the magnetic energy recovery switch, wherein a value of an inductive reactance on the inductive load side rather than an output end of the magnetic energy recovery switch exceeds a value of a capacitive reactance on the inductive load side rather than an output end of the magnetic energy recovery switch, and wherein the plurality of switches switch on and off when a voltage of both ends of the first capacitor is "0" (zero).

BRIEF DESCRIPTION OF DRAWINGS

FIG. 6A is a chart illustrating a first example of an operation simulation result of the power supply system regarding the power supply system according to the first embodiment.

FIG. 7 is a chart illustrating simulation results of a power supply system in an invention example and a power supply system in a comparative example in a tabular form.

FIG. 10 is a view explaining a flow of a current in an inverter unit regarding the power supply system according to the third embodiment.

DESCRIPTION OF EMBODIMENTS

Figure 1:
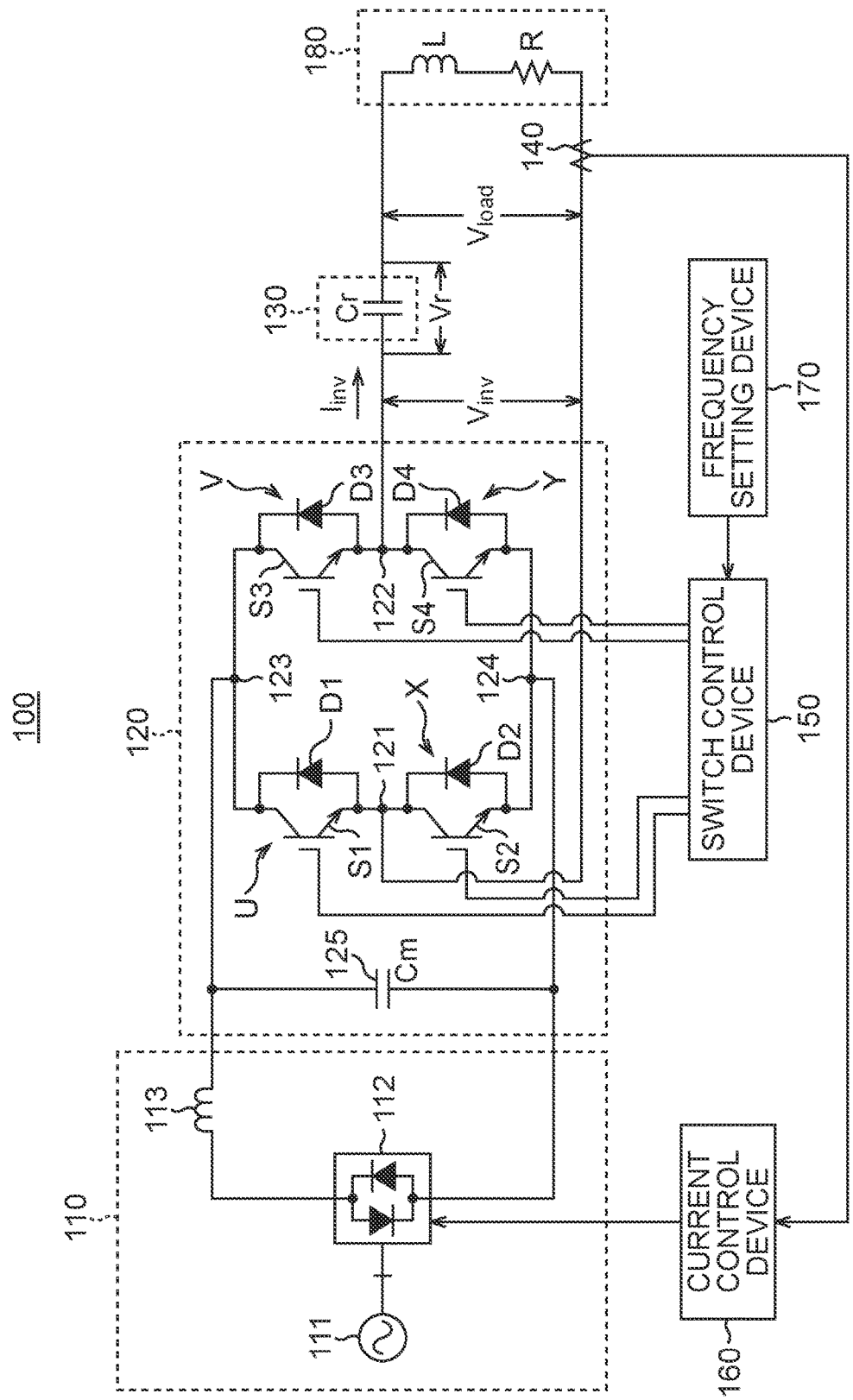
FIG. 1 is a view illustrating a configuration of a power supply system according to a first embodiment.

Hereinafter, embodiments of the present invention will be described referring to the drawings.

First Embodiment

First, a first embodiment is described.
<Circuit Configuration>

FIG. 1 is a view illustrating a configuration of a power supply system 100 according to the first embodiment. The power supply system 100 has a direct-current power supply unit 110, an inverter unit 120, a pseudo-resonant element 130, a current transformer 140, a switch control device 150, a current control device 160, and a frequency setting device 170. Each of the components of the power supply system 100 may be disposed in a distributed manner by connecting them so as to be capable of communicating with one another via a communication unit, for example. Note that the power supply system 100 does not have a specific device (oscillation suppression circuit) for suppressing an oscillating current.

[Direct-Current Power Supply Unit 110]

The direct-current power supply unit 110 supplies direct-current power to the inverter unit 120. The direct-current power supply unit 110 has an alternating-current power supply 111, a rectifier 112, and a reactor 113. The alternating-current power supply 111 outputs alternating-current power. The alternating-current power supply 111 is connected to an input end of the rectifier 112. One end of the reactor 113 is connected to one end of an output side of the rectifier 112. The rectifier 112 rectifies the alternating-current power supplied from the alternating-current power supply 111 to output the direct-current power. As the rectifier 112, for example, a thyristor rectifier is used. However, the rectifier 112 is not limited to the one described above. For example, the rectifier 112 may be constituted using a diode rectifier, a voltage control circuit (a step-up/down chopper or the like), and the like. The reactor 113 is the one for smoothing a waveform of the direct-current power outputted from the rectifier 112. In this embodiment, the direct-current power supply unit 110 is configured to convert the alternating-current power into the direct-current power. However the direct-current power supply unit 110 is not limited to the one described above. For example, the direct-current power supply unit 110 may be a power supply device which directly supplies a direct current. For example, the direct-current power supply unit 110 may be constituted using a battery, a current control circuit, and the like.

[Inverter Unit 120]

The inverter unit 120 converts the direct-current power outputted from the direct-current power supply unit 110 into alternating-current power with the same frequency as a switching frequency at which each switch of the inverter unit 120 is switched. Then, the inverter unit 120 supplies the alternating-current power with the frequency to an inductive load 180. The inverter unit 120 has a magnetic energy recovery switch (MERS).

One example of a configuration of the inverter unit 120 (magnetic energy recovery switch) of this embodiment is described.

The inverter unit 120 has a first switch U, a second switch X, a third switch V, a fourth switch Y, a first alternating-current terminal 121, a second alternating-current terminal 122, a first direct-current terminal 123, a second direct-current terminal 124, and a first capacitor 125.

First, the first switch U, the second switch X, the third switch V, and the fourth switch Y are described.

In this embodiment, the first switch U, the second switch X, the third switch V, and the fourth switch Y have the same configuration. A full-bridge circuit is constituted by the first switch U, the second switch X, the third switch V, and the fourth switch Y.

The first switch U has a self-arc-extinguishing element S1 and a free-wheeling diode D1. The second switch X has a self-arc-extinguishing element S2 and a free-wheeling diode D2. The third switch V has a self-arc-extinguishing element S3 and a free-wheeling diode D3. The fourth switch Y has a self-arc-extinguishing element S4 and a free-wheeling diode D4.

In the self-arc-extinguishing elements S1 to S4, as a conduction state, either state of a state which allows a current to flow and a state which does not allow a current to flow can be switched by a signal from the exterior.

The free-wheeling diodes D1 to D4 each have a first end portion and a second end portion. The free-wheeling diodes D1 to D4 each have only a state of passing a current from the first end portion to the second end portion but not passing a current from the second end portion to the first portion as a conduction state. A direction from the first end portion to the second end portion of each of the free-wheeling diodes D1 to D4 is set as a forward direction in each of the free-wheeling diodes D1 to D4. The first end portion of each of the free-wheeling diodes D1 to D4 is set as an end portion on the forward direction side. The second end portion of each of the free-wheeling diodes D1 to D4 is set as an end portion on a backward side to the forward direction.

The self-arc-extinguishing elements S1 to S4 each have a first end portion and a second end portion. The self-arc-extinguishing elements S1 to S4 each pass a current from the first end portion to the second end portion in a case of a state in which a current can be passed. The self-arc-extinguishing elements S1 to S4 each do not pass a current from the first end portion to the second end portion in a case of a state in which a current cannot be passed. Further, The self-arc-extinguishing elements S1 to S4 each do not pass a current from the second end portion to the first end portion in any state. A direction from the first end portion to the second end portion of each of the self-arc-extinguishing elements S1 to S4 is set as a forward direction in each of the self-arc-extinguishing elements S1 to S4. The first end portion of each of the self-arc-extinguishing elements S1 to S4 is set as an end portion on the forward direction side. The second end portion of each of the self-arc-extinguishing elements S1 to S4 is set as an end portion on a backward side to the forward direction. The self-arc-extinguishing elements S1 to S4 are not limited to a bipolar-type transistor. For example, the self-arc-extinguishing elements S1 to S4 can employ a field-effect transistor (FET), an insulated gate bipolar transistor (IGBT), an injection enhanced gate transistor (IEGT), a gate turn-off thyristor (GOT thyristor), or a gate commutated turn-off thyristor (GCT thyristor).

The self-arc-extinguishing element S1 and the free-wheeling diode D1 are connected in parallel so that their forward directions are backward to each other. Regarding the above, the self-arc-extinguishing element S2 and the free-wheeling diode D2, the self-arc-extinguishing element S3 and the free-wheeling diode D3, and the self-arc-extinguishing element S4 and the free-wheeling diode D4 are the same as the self-arc-extinguishing element S1 and the free-wheeling diode D1.

A connection point of the end portion on the forward direction side of each of the free-wheeling diodes D1, D2, D3, and D4 and the end portion on the backward side to the forward direction of each of the self-arc-extinguishing elements S1, S2, S3, and S4 is set as a negative electrode terminal. A connection point of the end portion on the forward direction side of each of the self-arc-extinguishing elements S1, S2, S3, and S4 and the end portion on the backward side to the forward direction of each of the free-wheeling diodes D1, D2, D3, and D4 is set as a positive electrode terminal.

The negative electrode terminal of the first switch U and the positive electrode terminal of the second switch X are connected to each other. The positive electrode terminal of the first switch U and the positive electrode terminal of the third switch V are connected to each other. The negative electrode terminal of the fourth switch Y and the negative electrode terminal of the second switch X are connected to each other. The positive electrode terminal of the fourth switch Y and the negative electrode terminal of the third switch V are connected to each other.

The first alternating-current terminal 121 is connected to a connection point of the negative electrode terminal of the first switch U and the positive electrode terminal of the second switch X. The second alternating-current terminal 122 is connected to a connection point of the negative electrode terminal of the third switch V and the positive electrode terminal of the fourth switch Y. In this embodiment, the first alternating-current terminal 121 and the second alternating-current terminal 122 are output ends of the inverter unit 120.

The first direct-current terminal 123 is connected to a connection point of the positive electrode terminal of the first switch U and the positive electrode terminal of the third switch V. To the first direct-current terminal 123, the other end of the reactor 113 is connected. The second direct-current terminal 124 is connected to a connection point of the negative electrode terminal of the second switch X and the negative electrode terminal of the fourth switch Y. To the second direct-current terminal 124, the other end on an output side of the rectifier 112 is connected. In this embodiment, the first direct-current terminal 123 and the second direct-current terminal 124 are input ends of the inverter unit 120.

The direct-current power supply unit 110 is connected between the first direct-current terminal 123 and the second direct-current terminal 124 as described above.

As long as the first switch U, the second switch X, the third switch V, and the fourth switch Y have the above-described conduction state, they do not necessarily have the free-wheeling diodes D1, D2, D3, and D4, and the self-arc-extinguishing elements S1, S2, S3, and S4. For example, the first switch U, the second switch X, the third switch V, and the fourth switch Y may be a metal-oxide semiconductor field-effect transistor (MOS transistor) in which a parasitic diode is built.

The first capacitor 125 is connected between the first direct-current terminal 123 and the second direct-current terminal 124. That is, one end of the first capacitor 125 and the first direct-current terminal 123 are connected to each other. The other end of the first capacitor 125 and the second direct-current terminal 124 are connected to each other. The first capacitor 125 is a capacitor having polarity.

[Pseudo-Resonant Element 130]

The pseudo-resonant element 130 is utilized for apparently reducing an inductance of the inductive load 180 seen from the output ends of the inverter unit 120. The pseudo-resonant element 130 is constituted of at least one passive element including a second capacitor. In this embodiment, the pseudo-resonant element 130 is constituted of the second capacitor. The second capacitor is a nonpolar capacitor.

The pseudo-resonant element 130 is connected in series with respect to the inductive load 180 between the first alternating-current terminal 121 and the second alternating-current terminal 122 of the inverter unit 120. In an example illustrated in FIG. 1, one end of the pseudo-resonant element 130 and the second alternating-current terminal 122 of the inverter unit 120 are connected to each other.

[Inductive Load 180]

The inductive load 180 is connected in series with respect to the first capacitor 125 between the first alternating-current terminal 121 and the second alternating-current terminal 122 of the inverter unit 120. In the example illustrated in FIG. 1, one end of the inductive load 180 and the other end of the pseudo-resonant element 130 are connected to each other. The other end of the inductive load 180 and the first alternating-current terminal 121 of the inverter unit 120 are connected to each other. The inductive load 100 is connected between the first alternating-current terminal 121 and the second alternating-current terminal 122 as described above. Further, the pseudo-resonant element 130 is connected in series with respect to the inductive load 180 between the first alternating-current terminal 121 and the second alternating-current terminal 122.

The inductive load 180 is a load having an inductance component. An inductive reactance of the inductive load 180 is larger than a capacitive reactance of the inductive load 180. In order to simplify the description, in the following description, the capacitive reactance of the inductive load 180 is set to "0" (zero). The inductive load 180 is a coil for induction heating an object to be heated such as a steel plate and the object to be heated, for example. The coil which induction heats the object to be heated of the inductive load 180 generates magnetic flux lines when an alternating current is supplied from the inverter unit 120. Owing to this magnetic flux lines, an eddy current flows through the object to be heated. The object to be heated is heated in a non-contact manner by this eddy current. Note that the inductive load 180 is not limited to the coil for induction heating the object to be heated. For example, the inductive load 180 may be a plurality of metal plates (for example, steel plates) to be subjected to resistance spot welding. In this case, the plurality of metal plates to become the inductive load 180 are current-heated. Further, in this embodiment, there is no load connected in parallel with respect to the first capacitor 125.

[Current Transformer 140]

The current transformer 140 measures a value of an alternating current flowing through the inductive load 180.

[Frequency Setting Device 170]

The frequency setting device 170 sets a switching frequency at which the first switch U, the second switch X, the third switch V, and the fourth switch Y are switched. When the inductive load 180 is the coil for induction heating the object to be heated, a frequency suitable for induction heating the object to be heated is set as the switching frequency. The frequency suitable for induction heating the object to be heated is determined based on a condition including a specification of an induction heating device, and a shape, a width, a thickness, and a heating temperature of the object to be heated, for example. For example, an operator examines a switching frequency in a case of varying the specification of the induction heating device, and the shape, the width, the thickness, and the heating temperature of the object to be heated as the frequency suitable for induction heating the object to be heated, in advance. The frequency setting device 170 makes it possible to store the frequency examined in this manner in a storage device such as a ROM in advance. Further, the frequency setting device 170 also makes it possible to input information of the switching frequency based on an operation of the operator via an input interface such as a screen for inputting the frequency.

[Switch Control Device 150]

The switch control device 150 generates a switching signal for switching the first switch U, the second switch X, the third switch V, and the fourth switch Y at the switching frequency set by the frequency setting device 170. Then, the switch control device 150 outputs the switching signal to the first switch U, the second switch X, the third switch V, and the fourth switch Y. Based on this switching signal, the conduction state of the self-arc-extinguishing elements S1, S2, S3, and S4 of the first switch U, the second switch X, the third switch V, and the fourth switch Y is switched. Hereinafter, a state in which the self-arc-extinguishing elements S1, S2, S3, and S4 can pass a current is referred to as on. Further, a state in which the self-arc-extinguishing elements S1, S2, S3, and S4 cannot pass a current is referred to as off.

The switch control device 150 turns the second switch X and the third switch V to off when the first switch U and the fourth switch Y are on. Further, the switch control device 150 turns the second switch X and the third switch V to on when the first switch U and the fourth switch Y are off. Further, the switch control device 150 switches on and off of each of the first switch U, the second switch X, the third switch V, and the fourth switch Y at the switching frequency set by the frequency setting device 170. Note that a frequency of a current $I_{inv}$ which the inverter unit 120 outputs is set as the switching frequency (details of this point are described below). In this embodiment, the switching frequency at which the first switch U, the second switch X, the third switch V, and the fourth switch Y are switched is an output frequency of the magnetic energy recovery switch.

The switching frequency at which the switch control device 150 switches the first switch U, the second switch X, the third switch V, and the fourth switch Y is set as f. In this case, the inverter unit 120 supplies the current $I_{inv}$ with the frequency f to the inductive load 180.

[Current Control Device 160]

The current control device 160 monitors a current measured by the current transformer 140. Then, the current control device 160 controls an operation of the rectifier 112 so that the current measured by the current transformer 140 becomes a target value. When the inductive load 180 is the coil for induction heating the object to be heated, the target value is determined based on a physical property value and a size of the object to be heated, and the like. When the object to be heated is a steel plate, the physical property value includes magnetic permeability and resistivity, for example.

<Equivalent Circuit>

Here, an inductive load having a reactance obtained by subtracting a capacitive reactance of the pseudo-resonant element 130 from the inductive reactance of the inductive load 180 is assumed to be an apparent inductive load seen from the inverter unit 120. As described below, the inductive reactance of the inductive load 180 exceeds the capacitive reactance of the pseudo-resonant element 130. Accordingly, the apparent inductive load has an inductance component.

An angular frequency ω [rad/s] is represented by 2 πf using the frequency f [Hz]. An inductance of the inductive load 180 is set as L. An inductance of the apparent inductive load is set as L'. Further, an electrostatic capacitance of the second capacitor of the pseudo-resonant element 130 is set as $C_r$. In that case, a reactance $\omega L'$ of the apparent inductive load is as in the following (1) expression.
[Mathematical Expression 1]

[Mathematical expression 1]

$$\omega L' = \omega L - \frac{1}{\omega C_r} \quad (1)$$

$$L' = L - \frac{1}{\omega^2 C_r} \quad (2)$$

That is, a circuit configuration of the power supply system 100 is equivalent to a circuit in which an inductive load with an inductance L' represented by (2) expression is connected between the first alternating-current terminal 121 and the second alternating-current terminal 122 of the inverter unit 120.

Figure 2:
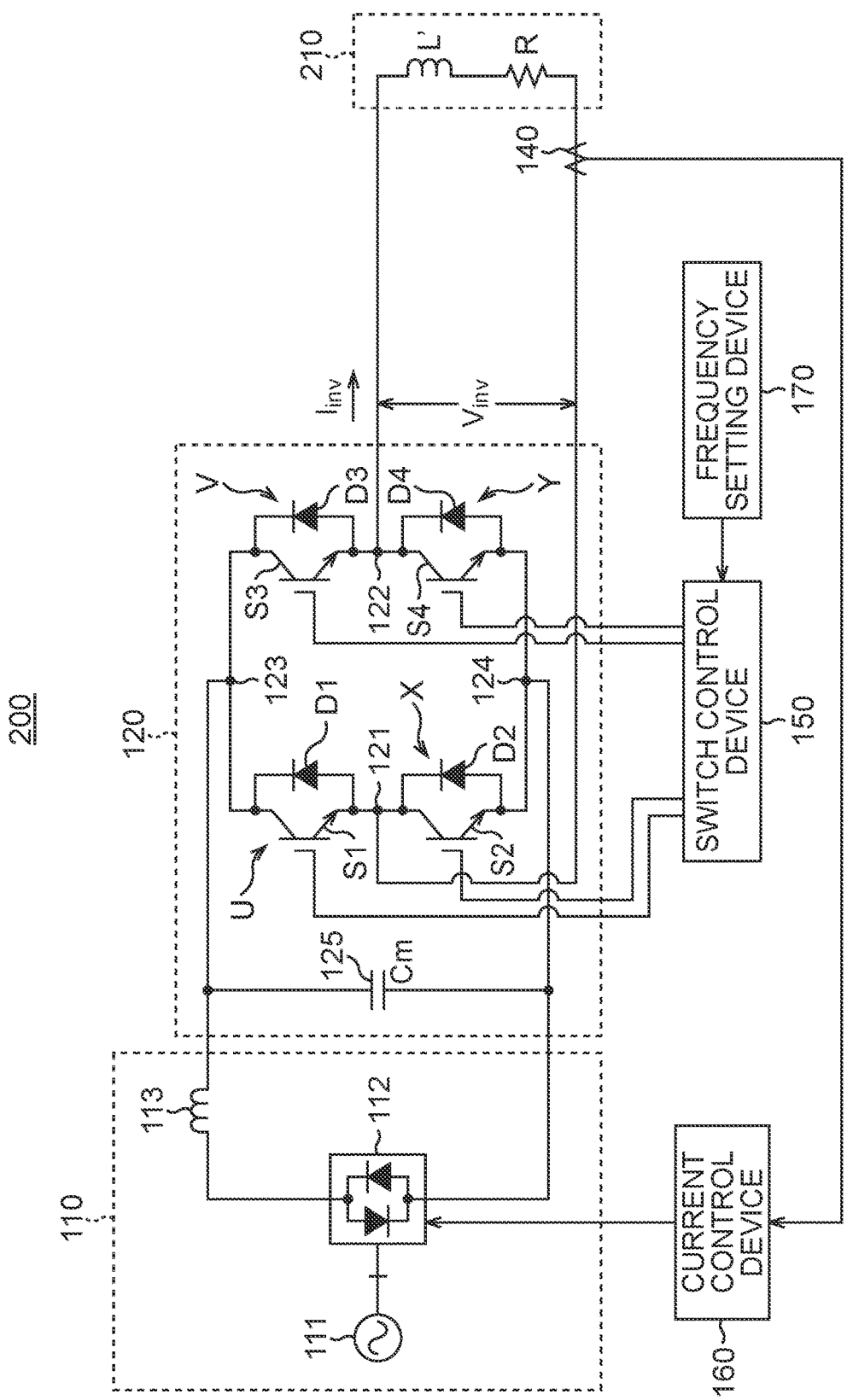
FIG. 2 is a view illustrating one example of a configuration of a power supply system equivalent to the power supply system in FIG. 1.

FIG. 2 is a view illustrating one example of a configuration of a power supply system equivalent to the power supply system 100 in FIG. 1. FIG. 2 is a view in which an apparent inductive load 210 is disposed instead of the pseudo-resonant element 130 and the inductive load 180 illustrated in FIG. 1.

As illustrated in FIG. 2, a power supply system 200 does not have the pseudo-resonant element 130, but has an apparent inductive load 210 whose inductance is L'. The power supply system 200 illustrated in FIG. 2 is different from the power supply system 100 illustrated in FIG. 1 in the elements constituting the circuit as described above. However, the power supply system 200 illustrated in FIG. 2 is equivalent to the power supply system 100 illustrated in FIG. 1. That is, the power supply system 100 of this embodiment apparently reduces the inductance of the inductive load 180 by having the pseudo-resonant element 130 connected in series with respect to the inductive load 180.

<Operation of Inverter Unit 120>

Figure 3:
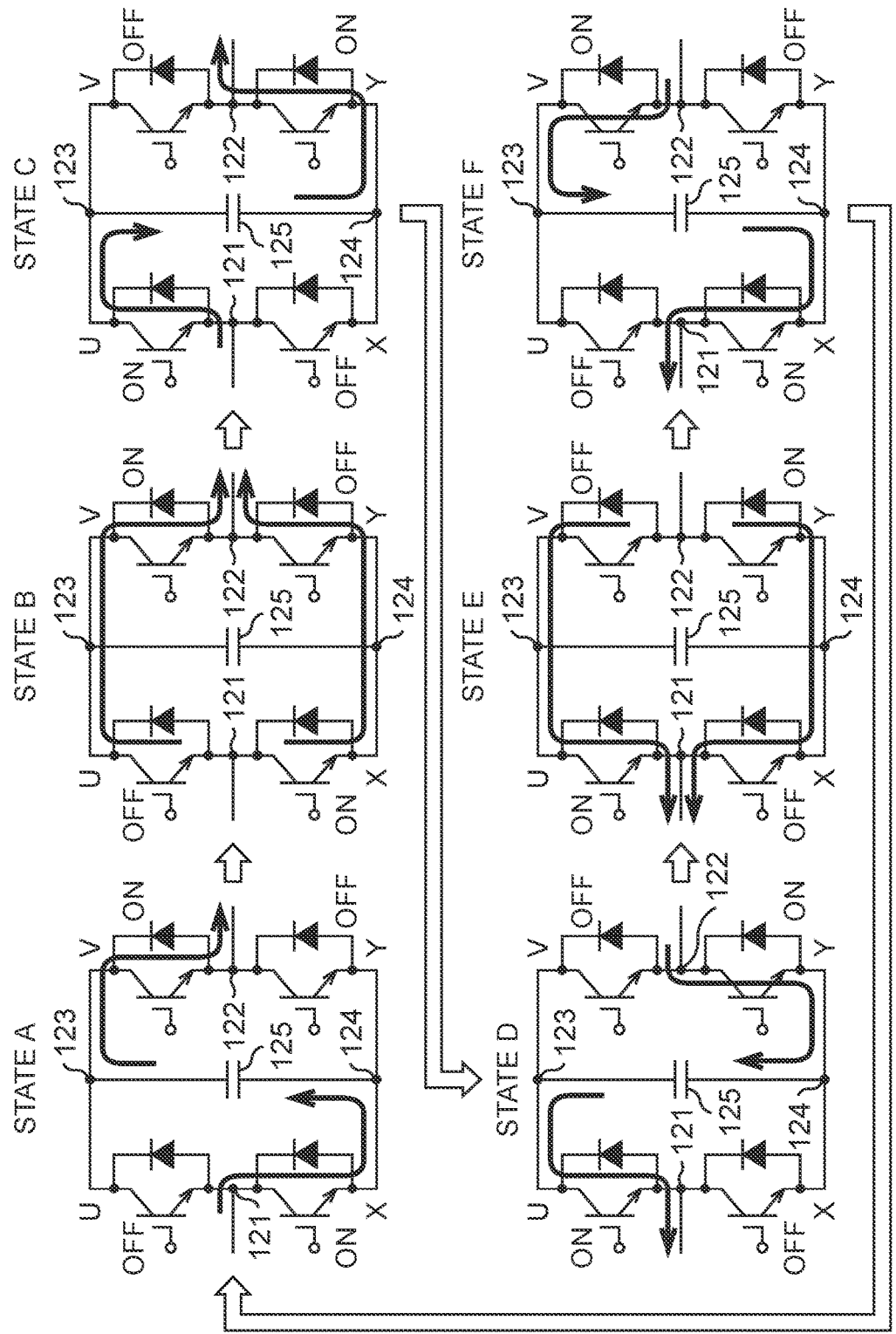
FIG. 3 is a view explaining a flow of a current in an inverter unit regarding the power supply system according to the first embodiment.
Figure 4A:
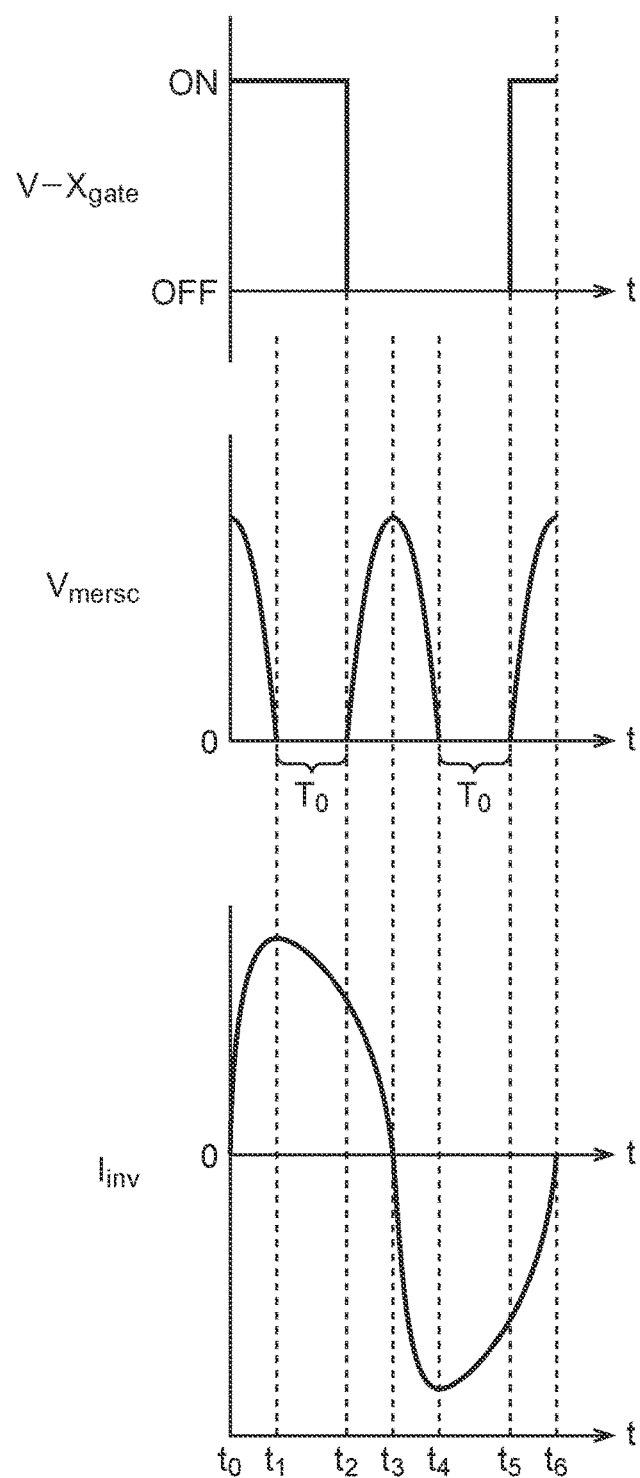
FIG. 4A is a chart explaining a first example of a relationship among a switching signal of a second switch and a third switch, a voltage applied to a first capacitor, and a current outputted from the inverter unit regarding the power supply system according to the first embodiment.
Figure 4B:
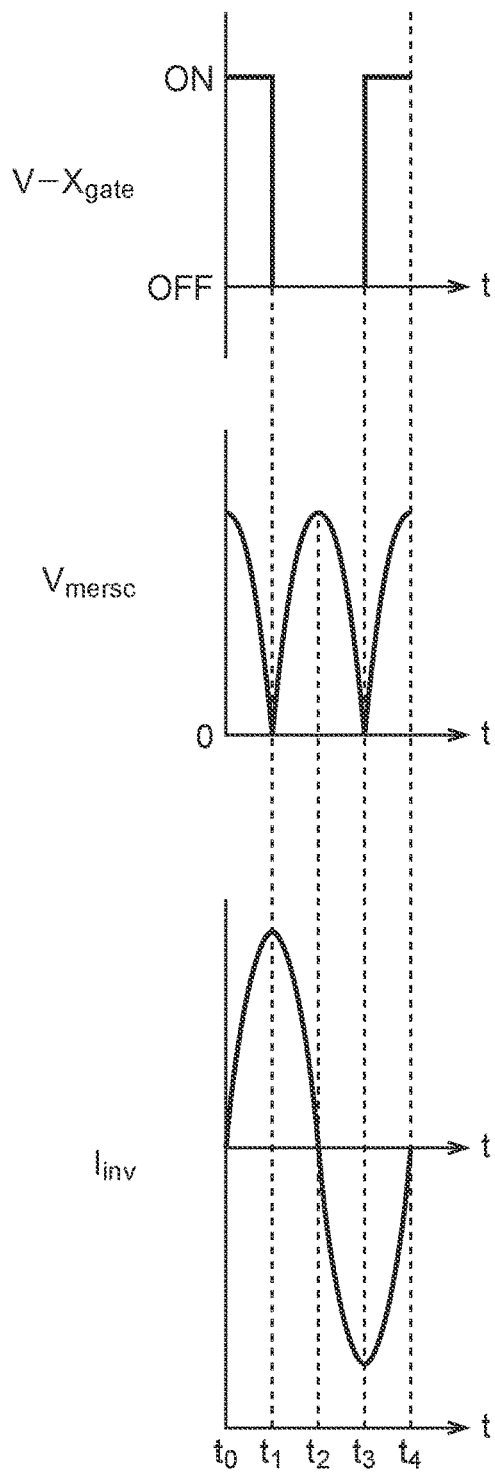
FIG. 4B is a chart explaining a second example of a relationship among a switching signal of the second switch and the third switch, a voltage applied to the first capacitor, and a current outputted from the inverter unit regarding the power supply system according to the first embodiment.

Next, one example of an operation of the inverter unit 120 is described. FIG. 3 is a view explaining one example of a flow of a current in the inverter unit 120. FIG. 4A is a chart explaining a first example of a relationship among a switching signal V-$X_{gate}$ of the second switch X and the third switch V, a voltage $V_{mersc}$ applied to the first capacitor 125, and a current $I_{inv}$ outputted from the inverter unit 120. FIG. 4B is a chart explaining a second example of a relationship among a switching signal V-$X_{gate}$ of the second switch X and the third switch V, a voltage $V_{mersc}$ applied to the first capacitor 125, and a current $I_{inv}$ outputted from the inverter unit 120.

First, one example of an operation of the inverter unit 120 when a time period $T_0$ in which the voltage $V_{mersc}$ applied to the first capacitor 125 remains "0" (zero) exceeds "0" (zero) is described referring to FIG. 3 and FIG. 4A.

An initial state is set as a state in which the first capacitor 125 is charged, the first switch U and the fourth switch Y are off, and the second switch X and the third switch V are on.

As illustrated in a state A in FIG. 3, when the first capacitor 125 starts discharging, a current discharged from the first capacitor 125 goes to the first direct-current terminal 123. Since the first switch U is off and the third switch V is on, the current flowing into the first direct-current terminal 123 flows via the third switch V toward the second alternating-current terminal 122. Then, since the fourth switch Y is off, the current flowing into the second alternating-current terminal 122 cannot flow through the positive electrode terminal side of the fourth switch Y and flows toward the pseudo-resonant element 130 and the inductive load 180. The current passing the inductive load 180 goes to the first alternating-current terminal 121. The current flowing into the first alternating-current terminal 121 goes via the second switch X to the second direct-current terminal 124 since the second switch X is on. The current flowing into the second direct-current terminal 124 goes back to the first capacitor 125.

A change of a voltage applied to the first capacitor 125 after the first capacitor 125 starts discharging and a change of a current outputted from the inverter unit 120 are described using FIG. 4A. V-$X_{gate}$ is a signal which the switch control device 150 transmits to the second switch X and the third switch V, and an on and off switching signal of the second switch X and the third switch V. Note that when the switching signal V-$X_{gate}$ indicates an on value, the second switch X and the third switch V are in an on state, and when the switching signal V-$X_{gate}$ indicates an off value, the second switch X and the third switch V are in an off state. Further, although an illustration is omitted here, the switch control device 150 also transmits a switching signal U-$Y_{gate}$ to the first switch U and the fourth switch Y. A value of the switching signal U-$Y_{gate}$ indicates a value opposite to the switching signal transmitted to the second switch X and the third switch V. That is, the value of the switching signal U-$Y_{gate}$ indicates an off value when the switching signal V-$X_{gate}$ indicates the on value, and it indicates an on value when the switching signal V-$X_{gate}$ indicates the off value. $V_{mersc}$ indicates a voltage applied to the first capacitor 125. $I_{inv}$ indicates a current outputted from the inverter unit 120. $t_0$ indicates a time at which the first capacitor 125 starts discharging. When the first capacitor 125 starts discharging, the current $I_{inv}$ outputted from the inverter unit 120 increases in a plus direction, and the voltage $V_{mersc}$ applied to the first capacitor 125 starts decreasing. When the first capacitor 125 finishes discharging, the voltage $V_{mersc}$ applied to the first capacitor 125 becomes "0" (zero). $t_1$ indicates a time at which the first capacitor 125 finishes discharging.

At the time $t_1$, when the discharge of the first capacitor 125 finishes, the current $I_{inv}$ outputted from the inverter unit 120 reaches a peak, and the voltage $V_{mersc}$ of the first capacitor 125 becomes "0" (zero). Since a voltage between the first direct-current terminal 123 and the second direct-current terminal 124 is "0" (zero), a current does not flow between the first direct-current terminal 123 and the second direct-current terminal 124. In this case, as illustrated in a state B in FIG. 3, part of the current flowing into the first alternating-current terminal 121 goes via the free-wheeling diode D1 of the first switch U to the first direct-current terminal 123, and goes via the third switch V to the second alternating-current terminal 122. The remainder of the current flowing into the first alternating-current terminal 121 goes via the second switch X to the second direct-current terminal 124, and goes via the free-wheeling diode D4 of the fourth switch Y to the second alternating-current terminal 122. In this case, the voltage $V_{mersc}$ applied to the first capacitor 125 is "0" (zero). Accordingly, voltages applied to the first switch U, the second switch X, the third switch V, and the fourth switch Y also become "0" (zero). The time period in which the voltage $V_{mersc}$ applied to the first capacitor 125 is "0" (zero) is set as $T_0$.

In a state B in FIG. 3, the current flowing through the inverter unit 120 and the inductive load 180 gradually decreases according to a time constant determined from the inductance and a resistance component of the inductive load

180. As illustrated in FIG. 4A, the current $I_{inv}$ outputted from the inverter unit 120 decreases in the time period of the time $t_1$ to a time $t_2$.

The switch control device 150 switches the first switch U and the fourth switch Y to on and the second switch X and the third switch V to off at the time $t_2$ at which the time period $T_0$ passes from the time $t_1$ at which the discharge of the first capacitor 125 finishes. At this time, the voltage $V_{mersc}$ applied to the first capacitor 125 is "0" (zero), thereby resulting in soft switching. Note that the soft switching indicates that when a voltage applied to a switch is theoretically "0" (zero), the switch is switched from on to off or from off to on.

When the first switch U and the fourth switch Y are switched to on and the second switch X and the third switch V are switched to off, the current flowing into the first alternating-current terminal 121 cannot flow through the second switch X and goes via the first switch U to the first direct-current terminal 123 since the second switch X is off as illustrated in a state C in FIG. 3. The current flowing into the first direct-current terminal 123 cannot flow through the third switch V and goes to the first capacitor 125 since the third switch V is off. The current flowing into the first capacitor 125 is utilized for a charge of the first capacitor 125, and gradually decreases. This current flows as illustrated in the state C in FIG. 3 until the first capacitor 125 finishes charging, and becomes "0" (zero) at a time point at which the charge of the first capacitor 125 finishes. In FIG. 4A, the first capacitor 125 finishes charging at a time $t_3$.

As illustrated in FIG. 4A, the voltage $V_{mersc}$ applied to the first capacitor 125 rises between the time $t_2$ and the time $t_3$. Further, in accordance with a rise in the voltage $V_{mersc}$ applied to the first capacitor 125, the current $I_{inv}$ outputted from the inverter unit 120 decreases. When the charge of the first capacitor 125 finishes at the time $t_3$, the voltage $V_{mersc}$ applied to the first capacitor 125 reaches a peak. At this time, the current $I_{inv}$ outputted from the inverter unit 120 becomes "0" (zero).

After the charge of the first capacitor 125 finishes, the first capacitor 125 starts discharging. As illustrated in a state D in FIG. 3, the current discharged from the first capacitor 125 goes to the first direct-current terminal 123. Since the first switch U is on and the third switch V is off, this current goes via the first switch U to the first alternating-current terminal 121, and flows into the inductive load 180 and the pseudo-resonant element 130. The current flowing into the pseudo-resonant element 130 goes to the second alternating-current terminal 122, and goes via the fourth switch Y and the second direct-current terminal 124 to the first capacitor 125. Thus, the current flowing from the second alternating-current terminal 122 via the pseudo-resonant element 130 and the inductive load 180 toward the first alternating-current terminal 121 in the initial state flows from the first alternating-current terminal 121 via the inductive load 180 and the pseudo-resonant element 130 through the second alternating-current terminal 122. That is, a direction of the current flowing into the pseudo-resonant element 130 and the inductive load 180 is opposite to that in the states A to C. Thus, by switching on and off of the first switch U, the second switch X, the third switch V, and the fourth switch Y at a switching frequency f set by the switch control device 150, the inverter unit 120 outputs the current $I_{inv}$ with the same frequency as the switching frequency f.

In FIG. 4A, the first capacitor 125 finishes discharging at a time $t_4$. As illustrated in FIG. 4A, the voltage $V_{mersc}$ applied to the first capacitor 125 continues decreasing from the time $t_3$ in accordance with the discharge of the first capacitor 125, and becomes "0" (zero) at the time $t_4$. Further, the current $I_{inv}$ outputted from the inverter unit 120 increases in a direction opposite to a direction in the time $t_0$ to the time $t_3$ in accordance with the discharge of the first capacitor 125. Then, the current $I_{inv}$ outputted from the inverter unit 120 reaches a peak in a direction opposite to a direction in the time $t_0$ to the time $t_3$ at the time $t_4$ at which the discharge of the first capacitor 125 finishes. A direction of the current $I_{inv}$ outputted from the inverter unit 120 between the time $t_3$ and the time $t_4$ is opposite to a direction of the current $I_{inv}$ outputted from the inverter unit 120 between the time $t_0$ and the time $t_1$. Therefore, in a graph in FIG. 4A, a value of the current $I_{inv}$ outputted from the inverter unit 120 between the time $t_3$ and the time $t_4$ is a minus value.

At the time $t_4$, when the discharge of the first capacitor 125 finishes, the voltage $V_{mersc}$ applied to the first capacitor 125 becomes "0" (zero). Since a voltage between the first direct-current terminal 123 and the second direct-current terminal 124 is "0" (zero), a current does not flow between the first direct-current terminal 123 and the second direct-current terminal 124 as illustrated in a state E in FIG. 3. In this case, part of the current flowing into the second alternating-current terminal 122 goes via the free-wheeling diode D3 of the third switch V to the first direct-current terminal 123, and goes via the first switch U to the first alternating-current terminal 121. The remainder of the current flowing into the second alternating-current terminal 122 goes via the fourth switch Y to the second direct-current terminal 124, and goes via the free-wheeling diode D2 of the second switch X to the first alternating-current terminal 121.

In a state E in FIG. 3, the current flowing through the inverter unit 120 and the inductive load 180 gradually approaches "0" (zero) according to the time constant based on the inductance and the resistance component of the inductive load 180. As illustrated in FIG. 4A, the current $I_{inv}$ outputted from the inverter unit 120 approaches "0" (zero) in the time period of the time $t_4$ to a time $t_5$.

The switch control device 150 switches the first switch U and the fourth switch Y to off and the second switch X and the third switch V to on at the time $t_5$ at which the time period $T_0$ passes from the time $t_4$ at which the discharge of the first capacitor 125 finishes. At this time, the voltage $V_{mersc}$ applied to the first capacitor 125 is "0" (zero), thereby resulting in the soft switching.

When the first switch U and the fourth switch Y are switched to off and the second switch X and the third switch V are switched to on, the current flowing into the second alternating-current terminal 122 goes via the third switch V to the first direct-current terminal 123 since the fourth switch Y is off as illustrated in a state F in FIG. 3. The current flowing into the first direct-current terminal 123 goes to the first capacitor 125 since the first switch U is off. The current flowing into the first capacitor 125 approaches "0" (zero) further. This current flows as illustrated in the state F in FIG. 3 until the first capacitor 125 finishes charging, and becomes "0" (zero) at the time point at which the charge of the first capacitor 125 finishes.

As illustrated in FIG. 4A, the voltage $V_{mersc}$ applied to the first capacitor 125 rises between the time $t_5$ and a time $t_6$. Further, in accordance with a rise in the voltage $V_{mersc}$ applied to the first capacitor 125, the current $I_{inv}$ outputted from the inverter unit 120 approaches "0" (zero). When the charge of the first capacitor 125 finishes at the time $t_6$, the voltage $V_{mersc}$ applied to the first capacitor 125 reaches a peak. At this time, the current $I_{inv}$ outputted from the inverter unit 120 becomes "0" (zero).

At the time $t_6$, when the charge of the first capacitor 125 finishes, the first switch U and the fourth switch Y are off and the second switch X and the third switch V are on, thereby returning to the state A which is the initial state. The inverter unit 120 repeats the above operation.

As illustrated in the state C and the state F in FIG. 3, at a time of the charge of the first capacitor 125, the current flows from the first direct-current terminal 123 into the first capacitor 125. That is, in the first capacitor 125, necessarily, a positive electric charge accumulates on the first direct-current terminal 123 side and a negative electric charge accumulates on the second direct-current terminal 124 side. Therefore, as the first capacitor 125, a capacitor having polarity can be used. Further, a direction of a current flowing into the second capacitor included in the pseudo-resonant element 130 is not fixed. Therefore, as the second capacitor, the capacitor having polarity cannot be used, but a nonpolar capacitor is used.

As illustrated in FIG. 4A, as the current $I_{inv}$ outputted from the inverter unit 120, the current for one cycle of the alternating current is outputted. That is, the inverter unit 120 outputs the alternating current with the same frequency as the switching frequency f.

FIG. 4A illustrates a case where the time period $T_0$ in which the voltage $V_{mersc}$ applied to the first capacitor 125 remains "0" (zero) exceeds "0" (zero). In contrast with this, FIG. 4B illustrates a case where the time period $T_0$ in which the voltage $V_{mersc}$ applied to the first capacitor 125 remains "0" (zero) is "0" (zero). Hereinafter, one example of an operation of the inverter unit 120 when the time period $T_0$ in which the voltage $V_{mersc}$ applied to the first capacitor 125 remains "0" (zero) is "0" (zero) is described referring to FIG. 3 and FIG. 4B.

An initial state is set as a state in which the first capacitor 125 is charged, the first switch U and the fourth switch Y are off, and the second switch X and the third switch V are on.

When the time period $T_0$ in which the voltage $V_{mersc}$ applied to the first capacitor 125 remains "0" (zero) is "0" (zero), the first capacitor 125 performs the discharge between the time $t_0$ and the time $t_1$ as illustrated in FIG. 4B. Then, the voltage $V_{mersc}$ applied to the first capacitor 125 becomes "0" (zero) at the time $t_1$. The operation of the inverter unit 120 between the time $t_0$ and the time $t_1$ illustrated in FIG. 4B is the same as the operation of the inverter unit 120 between the time $t_0$ and the time $t_1$ illustrated in FIG. 4A.

In the example illustrated in FIG. 4A, the time period $T_0$ in which the voltage $V_{mersc}$ applied to the first capacitor 125 remains "0" (zero) is set after the time $t_1$. In contrast with this, in the example illustrated in FIG. 4B, the time period $T_0$ in which the voltage $V_{mersc}$ applied to the first capacitor 125 remains "0" (zero) is "0" (zero). Accordingly, the switch control device 150 switches the first switch U and the fourth switch Y to on and switches the second switch X and the third switch V to off at the time $t_1$ at which the discharge of the first capacitor 125 finishes (namely, without keeping time from when the discharge of the first capacitor 125 finishes).

In that case, the first capacitor 125 performs the charge between the time $t_1$ and the time $t_2$, and performs the discharge between the time $t_2$ and the time $t_3$. Then, the voltage $V_{mersc}$ applied to the first capacitor 125 becomes "0" (zero) at the time $t_3$. In the example illustrated in FIG. 4B as described above, the first switch U, the second switch X, the third switch V, and the fourth switch Y change from the state A to the state C in FIG. 3, and do not change to the state B. The operation of the inverter unit 120 between the time $t_1$ and the time $t_3$ illustrated in FIG. 4B is the same as the operation of the inverter unit 120 between the time $t_2$ and the time $t_4$ illustrated in FIG. 4A.

Thereafter, in the example illustrated in FIG. 4A, the time period $T_0$ in which the voltage $V_{mersc}$ applied to the first capacitor 125 remains "0" (zero) is set. In contrast with this, in the example illustrated in FIG. 4B, the time period $T_0$ in which the voltage $V_{mersc}$ applied to the first capacitor 125 remains "0" (zero) is "0" (zero). Accordingly, the switch control device 150 switches the first switch U and the fourth switch Y to off and switches the second switch X and the third switch V to on at the time $t_3$ at which the discharge of the first capacitor 125 finishes (namely, without keeping time from when the discharge of the first capacitor 125 finishes).

In that case, the first capacitor 125 performs the charge between the time $t_3$ and the time $t_4$. In the example illustrated in FIG. 4B as described above, the first switch U, the second switch X, the third switch V, and the fourth switch Y change from the state D to the state F in FIG. 3, and do not change to the state E. The operation of the inverter unit 120 between the time $t_3$ and the time $t_4$ illustrated in FIG. 4B is the same as the operation of the inverter unit 120 between the time $t_5$ and the time $t_6$ illustrated in FIG. 4A.

As illustrated in FIG. 4B, from the time $t_0$, the current $I_{inv}$ outputted from the inverter unit 120 increases in a plus direction with the discharge of the first capacitor 125. Then, the current $I_{inv}$ outputted from the inverter unit 120 reaches a peak at the time $t_1$ at which the discharge of the first capacitor 125 finishes. From the time $t_1$, the current $I_{inv}$ outputted from the inverter unit 120 approaches "0" (zero) with the charge of the first capacitor 125. Then, the current $I_{inv}$ outputted from the inverter unit 120 becomes "0" (zero) at the time $t_2$ at which the charge of the first capacitor 125 finishes.

From the time $t_2$, the direction of the current $I_{inv}$ outputted from the inverter unit 120 is opposite to the direction in the time $t_0$ to the time $t_2$. From the time $t_2$, the current $I_{inv}$ outputted from the inverter unit 120 increases in the direction opposite to the direction in the time $t_0$ to the time $t_2$ with the discharge of the first capacitor 125. Then, the current $I_{inv}$ outputted from the inverter unit 120 reaches a peak in the direction opposite to the direction in the time $t_0$ to the time $t_2$ at the time $t_3$ at which the discharge of the first capacitor 125 finishes. From the time $t_3$, The current $I_{inv}$ outputted from the inverter unit 120 approaches "0" (zero) with the charge of the first capacitor 125. Then, the current $I_{inv}$ outputted from the inverter unit 120 becomes "0" (zero) at the time $t_4$ at which the charge of the first capacitor 125 finishes.

The switch control device 150 switches on and off between the first switch U and the fourth switch Y, and the second switch X and the third switch V at the time $t_1$ and the time $t_3$ at which the voltage $V_{mersc}$ applied to the first capacitor 125 becomes "0" (zero). This allows the switch control device 150 to achieve the soft switching even when the time period $T_0$ in which the voltage $V_{mersc}$ applied to the first capacitor 125 remains "0" (zero) is "0" (zero).

Further, the time periods taken to charge and discharge the first capacitor 125 are a half cycle of a resonance frequency determined from an electrostatic capacitance $C_m$ of the first capacitor 125 and the inductance L' of the apparent inductive load 210. Therefore, as illustrated in FIG. 4B, when the time period $T_0$ in which the voltage $V_{mersc}$ applied to the first capacitor 125 remains "0" (zero) is "0" (zero), a frequency of the current $I_{inv}$ outputted from the inverter unit 120 is equal to the resonance frequency determined from the electrostatic capacitance $C_m$ of the first capacitor 125 and the inductance L' of the apparent inductive load 210.

As is apparent from the above description, by switching on and off between the first switch U and the fourth switch Y, and the second switch X and the third switch V, the first capacitor 125 and the pseudo-resonant element 130 are disposed in series on a path of the alternating current flowing through all or part of the first switch U, the second switch X, the third switch V, and the fourth switch Y. Note that in this embodiment, this alternating current does not flow separately through the inverter unit 120 except when it is in states of the state B and the state E illustrated in FIG. 3.

Further, as illustrated in FIG. 1, in a state (state of performing charge and discharge) of applying a voltage to the first capacitor 125, the inverter unit 120, the pseudo-resonant element 130, and the inductive load 180 can be regarded as a series resonant circuit in which the first capacitor 125, the pseudo-resonant element 130, and the inductive load 180 with an inductance L are connected in series. Further, the pseudo-resonant element 130 and the inductive load 180 are equivalent to the apparent inductive load 210 having the inductance L'. Accordingly, the series resonant circuit in which the inverter unit 120, the pseudo-resonant element 130, and the inductive load 180 are connected in series can be regarded as the series resonant circuit in which the first capacitor 125 and the apparent inductive load 210 are connected in series.

Therefore, the first capacitor 125 performs charge and discharge in a half cycle of a resonance frequency $f_{res}$ ($=1/(2\pi\times\sqrt{(L'\times C_m)})$) determined from the electrostatic capacitance $C_m$ of the first capacitor 125 and the inductance L' of the apparent inductive load 210. That is, the voltage $V_{mersc}$ applied to the first capacitor 125 is "0" (zero) at a time of a start of the charge of the first capacitor 125, rises with the charge of the first capacitor 125, and drops with the discharge of the first capacitor 125. Then, from timing at which the charge of the first capacitor 125 starts, at a time point at which the half cycle of the frequency $f_{res}$ passes, the voltage $V_{mersc}$ applied to the first capacitor 125 becomes "0" (zero) again.

That is, the first capacitor 125 and the apparent inductive load 210 resonate at the resonance frequency $f_{res}$ determined from the electrostatic capacitance $C_m$ of the first capacitor 125 and the inductance L' of the apparent inductive load 210. In order that the first capacitor 125 and the apparent inductive load 210 resonate, it is necessary that the angular frequency ω at which a synthetic reactance ($=\omega L - 1/(\omega \times C_m)$) of the first capacitor 125 and the apparent inductive load 210 is "0" (zero) exists. In order that the angular frequency ω which is $\omega=1/\sqrt{(L'\times C_m)}$ exists, it is necessary that $L'\times C_m$ is a positive real number. The electrostatic capacitance $C_m$ of the first capacitor 125 is a positive value because it is a scalar value. Accordingly, in order that $L'\times C_m$ is the positive real number, the inductance L' of the apparent inductive load 210 is required to be a positive value (namely a value exceeding "0" (zero)).

When the voltage $V_{mersc}$ applied to the first capacitor 125 becomes "0" (zero), a current does not flow through the first capacitor 125 until switching of on and off between the first switch U and the fourth switch Y, and the second switch X and the third switch V is performed. The switch control device 150 can achieve the soft switching by switching on and off between the first switch U and the fourth switch Y, and the second switch X and the third switch V at this timing.

Further, the switch control device 150 can adjust the frequency of a current $I_{Inv}$ outputted from the inverter unit 120 by adjusting the time period in which the voltage $V_{mersc}$ applied to the first capacitor 125 is "0" (zero). The time period from a time point at which the voltage $V_{mersc}$ applied to the first capacitor 125 becomes "0" (zero) to a time point at which the switching of on and off between the first switch U and the fourth switch Y, and the second switch X and the third switch V is performed is the same as the time period $T_0$ in which the voltage $V_{mersc}$ applied to the first capacitor 125 is "0" (zero). In that case, a relational expression of the next (3) expression is established.

[Mathematical Expression 2]

[Mathematical expression 2]

$$\frac{1}{f} = 2 \times \left(\frac{1}{2f_{res}} + To\right) = \frac{1}{f_{res}} + 2To \quad (3)$$

According to the (3) expression, a time period of one cycle of the resonance frequency $f_{res}$ is represented by the next (4) expression.

[Mathematical Expression 3]

[Mathematical expression 3]

$$\frac{1}{f_{res}} = \frac{1}{f} - 2To \quad (4)$$

The time period $T_0$ in which the voltage $V_{mersc}$ applied to the first capacitor 125 is "0" (zero) is a value of "0" (zero) or more. Accordingly, one cycle of the resonance frequency $f_{res}$ determined from the electrostatic capacitance $C_m$ of the first capacitor 125 and the inductance L' of the apparent inductive load 210 is one cycle or less of the switching frequency f of the inverter unit 120. That is, the resonance frequency $f_{res}$ determined from the electrostatic capacitance $C_m$ of the first capacitor 125 and the inductance L' of the apparent inductive load 210 is required to be a value larger than the switching frequency f. Accordingly, the electrostatic capacitance $C_m$ of the first capacitor 125 is required to be a value satisfying the next (5) expression.

[Mathematical Expression 4]

[Mathematical expression 4]

$$f_{res} = \frac{1}{2\pi\sqrt{L'C_m}} \geq f \quad (5)$$

When it is assumed that the resonance frequency $f_{res}$ is below the switching frequency f of the inverter unit 120, in the inverter unit 120, a case where the voltage $V_{mersc}$ applied to the first capacitor 125 is "0" (zero) does not occur, and the soft switching cannot be performed.

As described above, the switching frequency f of the inverter unit 120 is set to be equal to or less than the resonance frequency $f_{res}$ in the resonance circuit including the first capacitor 125, the pseudo-resonant element 130, and the inductive load 180.

According to the above, the power supply system 100 is required to have the first capacitor 125, the pseudo-resonant element 130, and the inductive load 180 such as to satisfy L'>0 and the (5) expression when the switching frequency of the inverter unit 120 is f. When the (5) expression is satisfied, $\sqrt{(L'\times C_m)}$ is a positive value. The electrostatic capacitance $C_m$ of the first capacitor 125 is a positive value. Accordingly, a relational expression of L'>0 is also satisfied.

Consequently, it is sufficient that the power supply system 100 has the first capacitor 125, the pseudo-resonant element 130, and the inductive load 180 such as to satisfy the (5) expression when the switching frequency of the inverter unit 120 is f.

As described above, the power supply system 100 can reduce an apparent reactance of the inductive load 180 and reduce the voltage $V_{inv}$ outputted from the inverter unit 120 by reducing the apparent inductance of the inductive load 180 seen from the inverter unit 120. If the current outputted from the inverter unit 120 is the same, a power supply capacity of the inverter unit 120 is finally smaller in a case of having the pseudo-resonant element 130 than in a case of not having the pseudo-resonant element 130.

Further, the power supply system 100 can generate the time period in which the voltage $V_{mersc}$ applied to the first capacitor 125 is "0" (zero) by making the first capacitor 125 and the apparent inductive load 210 resonate at a frequency equal to or more than the switching frequency f of the inverter unit 120. Then, the power supply system 100 can achieve the soft switching by switching on and off between the first switch U and the fourth switch Y, and the second switch X and the third switch V during the time period.

Further, the power supply system 100 is set to have the first capacitor 125, the pseudo-resonant element 130, and the inductive load 180 such as to satisfy the (5) expression at all frequencies which can be taken as the switching frequency f of the inverter unit 120. The power supply system 100 can achieve a reduction (namely, a reduction in the power supply capacity of the inverter unit 120) in the voltage $V_{inv}$ outputted from the inverter unit 120 and the soft switching by performing as described above even when the switching frequency f of the inverter unit 120 is changed by the switch control device 150.

Further, the pseudo-resonant element 130 is connected to the inductive load 180 not in parallel but in series. Further, there is no capacitor (passive element having a capacitive reactance) connected in parallel to the inductive load 180 on the inductive load 180 side rather than the inverter unit 120. Accordingly, the pseudo-resonant element 130 and the inductive load 180 do not constitute a closed circuit. Consequently, an oscillating current is not generated. Therefore, it is possible to suppress that an unexpected current flows into the inductive load 180. From the above, the inverter unit 120 can transmit a desired current whose oscillation is suppressed to the inductive load 180 without using a specific device such as an oscillation suppressing circuit.

Figure 5:
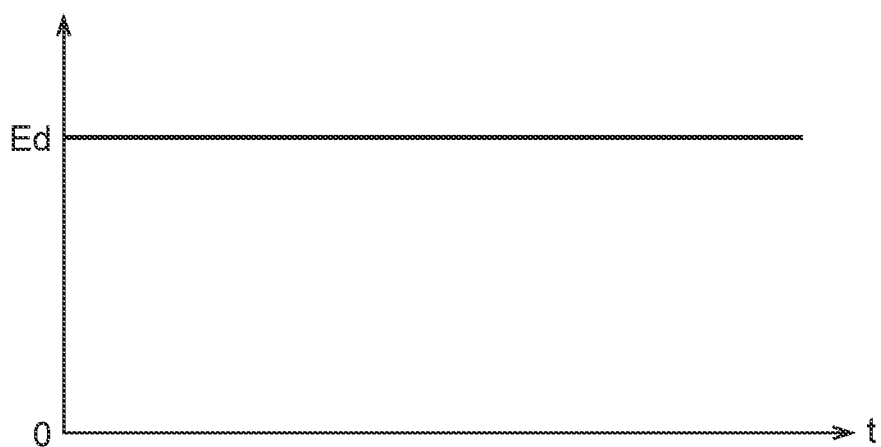
FIG. 5 is a chart illustrating one example of a voltage applied to a smoothing capacitor regarding the power supply system according to the first embodiment.

The inverter unit 120 performs the switching of on and off between the first switch U and the fourth switch Y, and the second switch X and the third switch V as described above. Accordingly, the inverter unit 120 repeats recovering magnetic energy stored in the inductive load 180 and storing it as electrostatic energy to charge the first capacitor 125, and supplying the electrostatic energy stored in the first capacitor 125 to the inductive load 180. Accordingly, the voltage $V_{mersc}$ applied to the first capacitor 125 becomes an alternating voltage including the time period in which the voltage $V_{mersc}$ applied to the first capacitor 125 is "0" (zero) as illustrated in FIG. 4A and FIG. 4B. That is, the first capacitor 125 is not the one for smoothing a waveform of the direct-current power outputted from the rectifier 112. When it is assumed that the first capacitor 125 is the one for smoothing the waveform of the direct-current power outputted from the rectifier 112, although a variation due to a pulsating current occurs, the voltage applied to the first capacitor 125 is generally a fixed value $E_d$ and does not take on a value of "0" (zero) as illustrated in FIG. 5. Moreover, in this case, it is necessary to make only the pseudo-resonant element 130 and the inductive load 180 resonate. However, under a condition indicated in the (5) expression, only the pseudo-resonant element 130 and the inductive load 180 do not resonate.

(Method of Reducing Power Supply Capacity of Inverter Unit 120)

A voltage outputted from the inverter unit 120 is set as $V_{inv}$, a current outputted from the inverter unit 120 is set as $I_{inv}$, a voltage applied to the pseudo-resonant element 130 is set as $V_r$, and a voltage applied to the inductive load 180 is set as $V_{load}$. A power supply capacity of the inverter unit 120 is $I_{inv} \times V_{inv}$. Further, the voltage $V_{load}$ applied to the inductive load 180 is the sum of a voltage $V_{inv}$ supplied from the inverter unit 120 and a voltage $V_r$ applied to the pseudo-resonant element 130. Accordingly, the next (6) expression is established.

$$V_{load} = V_{inv} + V_r \qquad (6)$$

That is, the inverter unit 120 and the pseudo-resonant element 130 share the voltage applied to the inductive load 180.

The current control device 160 controls an operation of the rectifier 112 so that a value of the current $I_{inv}$ outputted from the inverter unit 120 becomes a target value. Therefore, in order to reduce a value of the power supply capacity ($=I_{inv} \times V_{inv}$) of the inverter unit 120, it is sufficient to reduce the voltage $V_{inv}$ outputted from the inverter unit 120. The voltage $V_{inv}$ outputted from the inverter unit 120 is represented by the next (7) expression.

[Mathematical Expression 5]

[Mathematical expression 5]

$$V_{inv} = \frac{I_{inv}}{\omega C_m} \qquad (7)$$

Therefore, the larger the electrostatic capacitance $C_m$ of the first capacitor 125 is made, the smaller the voltage $V_{inv}$ outputted from the inverter unit 120 becomes.

In a state in which a voltage is applied to the first capacitor 125, the first capacitor 125, the pseudo-resonant element 130, and the inductive load 180 resonate at the resonance frequency $f_{res}$ (refer to the (5) expression for the resonance frequency $f_{res}$). In setting the resonance frequency $f_{res}$ not to change, as the electrostatic capacitance $C_m$ of the first capacitor 125 is made larger, the inductance L' becomes smaller. Because the inductance L' is represented by the next (8) expression, the smaller the electrostatic capacitance $C_r$ of the second capacitor of the pseudo-resonant element 130 becomes, the smaller the inductance L' becomes.

[Mathematical Expression 6]

[Mathematical expression 6]

$$L' = L - \frac{1}{\omega^2 C_r} \qquad (8)$$

(Specific Design Method)

Here, a specific example of a method of designing the electrostatic capacitance $C_m$ of the first capacitor 125 is described. Here, the switch control device 150 switches the first switch U and the fourth switch Y, and the second switch X and the third switch V at the switching frequencies f of 9.9 [kHz] to 7.0 [kHz]. In this case, the frequency of the current $I_{inv}$ outputted from the inverter unit 120 is 9.9 [kHz] to 7.0 [kHz].

The electrostatic capacitance $C_r$ of the second capacitor of the pseudo-resonant element 130 is set to 30 [μF]. The inductance L of the inductive load 180 of each frequency of the current $I_{inv}$ outputted from the inverter unit 120 is measured in advance, and is as follows.

9.9 [kHz] h; L=23.7 [μH]

7.0 [kHz] h; L=24.2 [μH]

In this embodiment, resonance is generated by the apparent inductive load 210 having the synthetic reactance of the pseudo-resonant element 130 and the inductive load 180, and the first capacitor 125. However, this resonance can also be regarded as resonance of a capacitor having a synthetic capacitance of the first capacitor 125 and the pseudo-resonant element 130 as an electrostatic capacitance, and the inductive load 180. Here, there is assumed a capacitor having a synthetic capacitance of the first capacitor 125 and the pseudo-resonant element 130 as an electrostatic capacitance. Further, this capacitor is referred to as a synthetic capacitor. Further, an electrostatic capacitance of the synthetic capacitor is set as $C_{res}$. In that case, because the electrostatic capacitance $C_{res}$ of the synthetic capacitor resonates with the inductance L of the inductive load 180, it is as represented by the next (9) expression.

[Mathematical Expression 7]

[Mathematical expression 7]

$$C_{res} = \frac{1}{\omega^2 L} \quad (9)$$

The electrostatic capacitance $C_{res}$ of the synthetic capacitor when the frequency of the current $I_{inv}$ outputted from the inverter unit 120 is 9.9 [kHz] is about 10 [μF] ($\approx 1/((2\pi \times 9.9 \times 10^3)^2 \times 23.7 \times 10^{-6})$). Because the synthetic reactance ($=\omega \times L'$) of the pseudo-resonant element 130 and the inductive load 180 seen from the inverter unit 120 is represented by the next (10) expression, the following (11) expression is established.

[Mathematical Expression 8]

[Mathematical expression 8]

$$\omega L' = \omega L - \frac{1}{\omega C_r} \quad (10)$$

$$L' = L - \frac{1}{\omega^2 C_r} \quad (11)$$

Since the inductance L' of the apparent inductive load 210 is required to be a value exceeding "0" (zero), according to the (11) expression, a relation of the next (12) expression is satisfied.

[Mathematical Expression 9]

[Mathematical expression 9]

$$L > \frac{1}{\omega^2 C_r} \quad (12)$$

Under the above condition, it is sufficient to design the electrostatic capacitance $C_m$ of the first capacitor 125 so that the switching of on and off between the first switch U and the fourth switch Y, and the second switch X and the third switch V is the soft switching.

When the frequency of the current $I_{inv}$ outputted from the inverter unit 120 is 9.9 [kHz], the time period $T_0$ in which the voltage $V_{mersc}$ applied to the first capacitor 125 remains "0" (zero) is set to 2.5 [μsec] ($T_0$=2.5 [μsec]). The time period $T_0$ in which the voltage $V_{mersc}$ applied to the first capacitor 125 remains "0" (zero) can be represented by the next (13) expression according to the (3) expression.

[Mathematical Expression 10]

[Mathematical expression 10]

$$To = \frac{\frac{1}{f} - \frac{1}{f_{res}}}{2} \quad (13)$$

Here, f is the switching frequency (=9.9 [kHz]) of the inverter unit 120. $f_{res}$ is the resonance frequency determined from the electrostatic capacitance $C_m$ of the first capacitor 125 and the inductance L' of the apparent inductive load 210.

According to this (13) expression, the resonance frequency $f_{res}$ is represented by the next (14) expression, and is about 10.4 [kHz] ($\approx 1/(1/9.9 \times 10^3 - 2 \times (2.5 \times 10^{-6}))$).

[Mathematical Expression 11]

[Mathematical expression 11]

$$f_{res} = \frac{1}{\frac{1}{f} - 2To} \quad (14)$$

Here, the angular frequency $\omega_{res}$ when the frequency is the resonance frequency $f_{res}$ determined from the electrostatic capacitance $C_m$ of the first capacitor 125 and the inductance L' of the apparent inductive load 210 is represented by the next (15) expression.

$$\omega_{res} = 2\pi f_{res} \quad (15)$$

The electrostatic capacitance $C_m$ of the first capacitor 125 resonates with the inductance L' of the apparent inductive load 210, and therefore the next (16) expression is established.

[Mathematical Expression 12]

[Mathematical expression 12]

$$C_m = \frac{1}{\omega_{res}^2 L'} = \frac{1}{\omega_{res}^2 \left(L - \frac{1}{\omega^2 C_r}\right)} \quad (16)$$

Because of L=23.7 [μH] and $C_r$=30 [μF], Cm≈15 [μF] is found by the (16) expression. That is, as the first capacitor 125, it is sufficient to utilize a capacitor having an electrostatic capacitance of 15 [μF]. Note that the (16) expression is the one in which the part of the equality of the (5) expression is deformed using the (8) expression. It is sufficient that the electrostatic capacitance $C_m$ of the first capacitor 125 satisfies the next (17) expression according to the (5) expression.

[Mathematical Expression 13]

[Mathematical expression 13]

$$C_m \leq \frac{1}{\omega^2 \left(L - \frac{1}{\omega^2 C_r}\right)} \quad (17)$$

Next, as $C_m=15$ [μF], a case where the switch control device 150 changes the switching frequency f of the inverter unit 120 to 7.0 [kHz] is described.

Because of L'>0, according to the (8) expression, a value of the electrostatic capacitance $C_r$ of the second capacitor of the pseudo-resonant element 130 is required to satisfy a relational expression of the next (18) expression. The (18) expression is deformed as is the next (19) expression.

[Mathematical Expression 14]

[Mathematical expression 14]

$$L > \frac{1}{\omega^2 C_r} \quad (18)$$

$$C_r > \frac{1}{\omega^2 L} \quad (19)$$

The angular frequency ω when the frequency is the switching frequency f of the inverter unit 120 is $2\pi \times 7.0 \times 10^3$ [rad/s]. The inductance L of the inductive load 180 in a case where the switching frequency f of the inverter unit 120 is 7.0 [kHz] is 24.2 [μH] as described above.

Accordingly, according to the (19) expression, the electrostatic capacitance $C_r$ of the second capacitor of the pseudo-resonant element 130 is required to exceed about 21.4 [μF] ($\approx 1/((2\pi \times 7 \times 10^3)^2 \times 24.2 \times 10^{-6})$). Here, since the electrostatic capacitance $C_r$ of the second capacitor of the pseudo-resonant element 130 is 30 [μF], the (19) expression is satisfied. That is, since the value of the inductance L' of the apparent inductive load 210 is a positive value, the pseudo-resonant element 130 and the inductive load 180 resonate with the first capacitor 125.

Further, the inductance L' of the apparent inductive load 210 in a case where the switching frequency f of the inverter unit 120 is 7.0 [kHz] is about 7.0 [μH] ($=24.2 \times 10^{-6} - 1/((2\pi \times 7.0 \times 10^3)^2 \times 30 \times 10^{-6})$) according to the (8) expression. The resonance frequency $f_{res}$ determined from the inductance L' of the apparent inductive load 210 and the electrostatic capacitance $C_m$ of the first capacitor 125 is about 15.5 [kHZ] ($=1/(2\pi \times \sqrt{(7.0 \times 10^{-6} \times 15 \times 10^{-6})})$) according to the (5) expression. Accordingly, the resonance frequency $f_{res}$ is higher than 7.0 [kHz]. Consequently, even in a case where the switching frequency f is 7.0 [kHz], the inverter unit 120 can achieve the soft switching.

The electrostatic capacitance $C_r$ of the second capacitor of the pseudo-resonant element 130 is determined so as to satisfy the (18) expression in accordance with the inductance L of the inductive load 180 and the switching frequency f. The electrostatic capacitance $C_m$ of the first capacitor 125 is determined so as to satisfy the (17) expression using the electrostatic capacitance $C_r$ of the second capacitor of the pseudo-resonant element 130 determined as described above. For example, when the inductive load 180 is the coil for induction heating the object to be heated such as a steel plate and the object to be heated, in the electrostatic capacitance $C_r$ of the second capacitor of the pseudo-resonant element 130, a proper value is selected from a range of, for example, 6.5 [μF] to 250 [μF], and in the electrostatic capacitance $C_m$ of the first capacitor 125, a proper value is selected from a range of, for example, 0.06 [μF] to 20 [μF].

(Simulation Result)

Figure 6B:
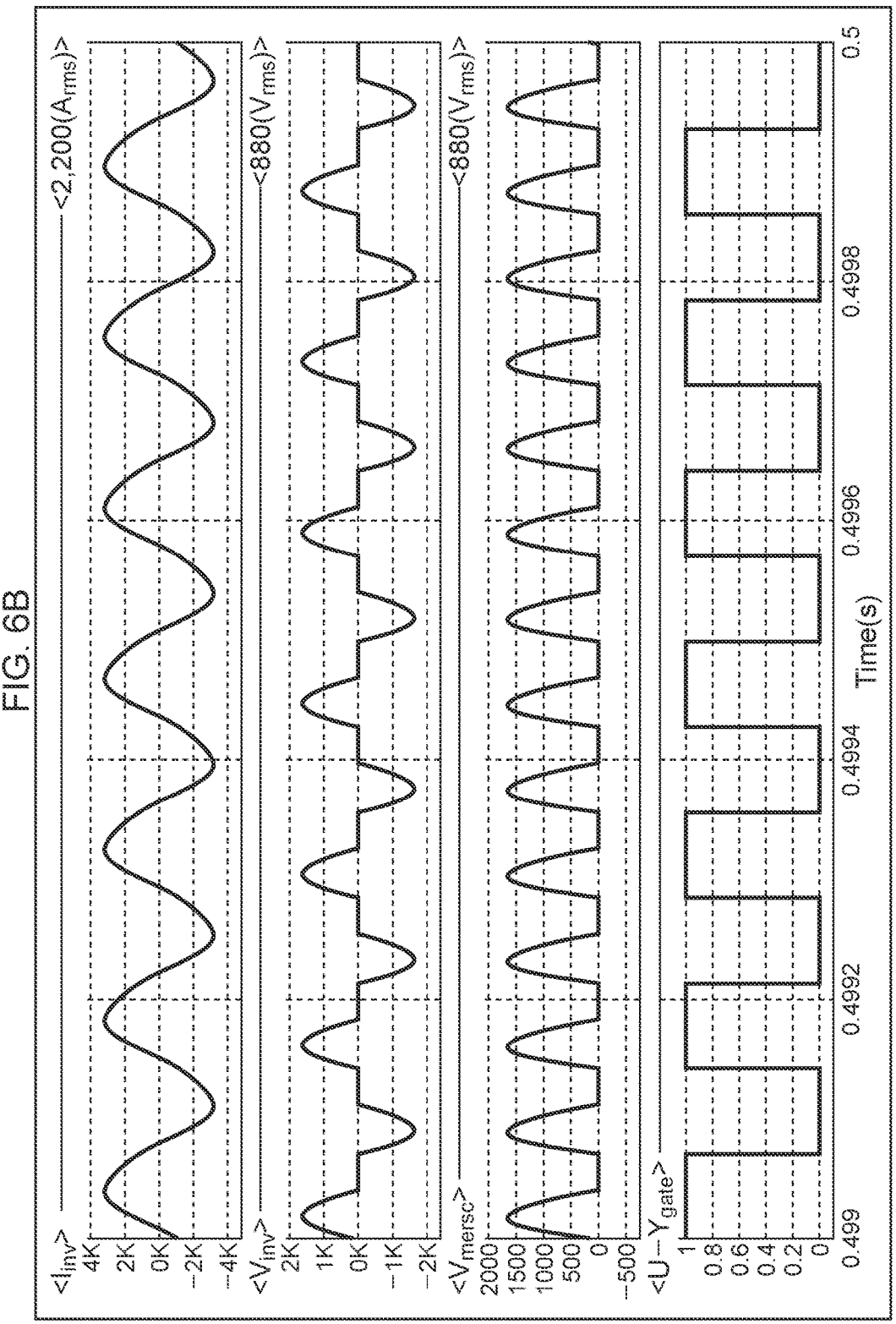
FIG. 6B is a chart illustrating a second example of an operation simulation result of the power supply system regarding the power supply system according to the first embodiment.

FIG. 6A and FIG. 6B are charts illustrating one example of operation simulation results of the power supply system 100 of this embodiment. Waveforms in FIG. 6A are waveforms when the switching frequency f of the inverter unit 120 is 9.9 [kHz] and the inductance L of the inductive load 180 is 23.7 [μH]. Waveforms in FIG. 6B are waveforms when the switching frequency f of the inverter unit 120 is 7.0 [kHz] and the inductance L of the inductive load 180 is 24.2 [μH]. Further, the waveforms illustrated in FIG. 6A and FIG. 6B are waveforms when the electrostatic capacitance $C_m$ of the first capacitor 125 is 15 [μF] and the electrostatic capacitance $C_r$ of the second capacitor of the pseudo-resonant element 130 is 30 [μF].

$I_{inv}$ indicates a current outputted from the inverter unit 120. $V_{inv}$ indicates a voltage outputted from the inverter unit 120. $V_{mersc}$ indicates a voltage applied to the first capacitor 125. Note that in FIG. 6A and FIG. 6B, Arms denoted beside the waveform of the current $I_{inv}$ outputted from the inverter unit 120 indicates an effective value of the waveform (current $I_{inv}$). Further, Vrms denoted beside the waveforms of the voltage $V_{inv}$ outputted from the inverter unit 120 and the voltage $V_{mersc}$ applied to the first capacitor 125 indicates effective values of the waveforms (voltages $V_{inv}$, $V_{mersc}$).

U-$Y_{gate}$ indicates the switching signal transmitted from the switch control device 150 to the first switch U and the fourth switch Y. The switch control device 150 transmits the switching signal V-$X_{gate}$ opposite to the switching signal indicated by U-$Y_{gate}$ to the second switch X and the third switch V.

In FIG. 6A and FIG. 6B, when the switching signal U-$Y_{gate}$ and the voltage $V_{mersc}$ applied to the first capacitor 125 are observed, it is found that at either switching frequency f, the switching of the the switching signal U-$Y_{gate}$ is performed when a value of the voltage $V_{mersc}$ applied to the first capacitor 125 is "0" (zero). That is, it is found that the first switch U, the second switch X, the third switch V, and the fourth switch Y are each switched between on and off in a state in which the voltage is not applied to the first capacitor 125. Accordingly, it is found that the soft switching is achieved. Further, it is also found by the current $I_{inv}$ outputted from the inverter unit 120 that the oscillating current is not generated.

FIG. 7 is a chart illustrating simulation results of a power supply system in the invention example and a power supply system in a comparative example in a tabular form. The power supply system in the invention example is the power supply system 100 of this embodiment. The power supply system in the comparative example is the one in which the pseudo-resonant element 130 is removed from the power supply system 100 of this embodiment. Except presence/absence of the pseudo-resonant element 130, the power supply system in the invention example and the power supply system in the comparative example are not different from each other. Note that Arms and Vrms illustrated in FIG. 7 present effective values similarly to FIG. 6A and FIG. 6B.

FIG. 7 illustrates the results of two kinds of the simulations in which the switching frequency f of the inverter unit 120 is 9.9 [kHz] and 7.0 [kHz]. Further, the electrostatic capacitance $C_m$ of the first capacitor 125 of each of the power supply systems is [μF]. The electrostatic capacitance $C_r$ of the pseudo-resonant element 130 (second capacitor) of the power supply system in the invention example is 30 [μF]. An electrostatic capacitance of the first capacitor 125 of the power supply system in the comparative example is 9.3 [μF]. Further, when the switching frequency f is 9.9 [kHz], the inductance L of the inductive load 180 is 23.7 [μH], and when it is 7.0 [kHz], it is 24.2 [μH]. Further, in the simulations, the inverter units 120 in the invention example and the comparative example output the same current.

As illustrated in FIG. 7, it is indicated that at either switching frequency f, the voltage $V_{inv}$ outputted from the inverter unit 120 is smaller in the power supply system 100 in the invention example. As a result, a power supply capacity of the inverter unit 120 of the power supply system 100 in the invention example is smaller than a power supply capacity of the inverter unit 120 of the power supply system in the comparative example. That is, using the pseudo-resonant element 130 makes it possible to reduce the power supply capacity of the inverter unit 120 of the power supply system.

Modified Example

In this embodiment, the description has been made by citing a case where the pseudo-resonant element 130 is constituted of the second capacitor as the example. However, it is sufficient that the pseudo-resonant element 130 includes the second capacitor. Further, the second capacitor may be one capacitor, or may be a plurality of capacitors connected to each other. The above plurality of capacitors may be connected to each other in series or connected to each other in parallel, or a portion connected in series and a portion connected in parallel may mix together. When the second capacitor is constituted by the plurality of capacitors connected to each other, the electrostatic capacitance $C_r$ of the second capacitor of the pseudo-resonant element 130 is a synthetic capacitance of the above plurality of capacitors in the description of this embodiment.

Further, when a capacitive reactance based on the electrostatic capacitance of the second capacitor included in the pseudo-resonant element 130 is larger than an inductive reactance of the inductive load 180, the pseudo-resonant element 130 may have a reactor in addition to the second capacitor. However, similarly to the description of this embodiment, a value of the inductive reactance on the inductive load 180 side rather than an output end of the magnetic energy recovery switch is set to exceed a value of the capacitive reactance on the inductive load 180 side rather than the output end of the magnetic energy recovery switch.

In this case, in the description of this embodiment, for example, it is sufficient that the inductance L of the inductive load 180 is replaced with a synthetic inductance of the inductive load 180 and the reactor included in the pseudo-resonant element 130. Accordingly, a value of a synthetic reactance of an inductive reactance of the pseudo-resonant element 130 and the inductive reactance of the inductive load 180 is set to exceed a value of the capacitive reactance of the pseudo-resonant element 130. In that case, the electrostatic capacitance $C_r$ of the second capacitor becomes a value exceeding a reciprocal of a value obtained by multiplying a synthetic inductance of an inductance of the pseudo-resonant element 130 and an inductance of the inductive load 180, and the square of the angular frequency $\omega$ (=2πf) corresponding to the switching frequency f at which the first switch U, the second switch X, the third switch V, and the fourth switch Y are switched. That is, the electrostatic capacitance $C_r$ of the second capacitor satisfies a condition that sets L in the (19) expression as the synthetic inductance of the inductance of the pseudo-resonant element 130 and the inductance of the inductive load 180.

Further, in this embodiment, the description has been made by citing a case where the first capacitor 125 is constituted of one capacitor as the example. However, it is sufficient that the first capacitor 125 is constituted by using at least one capacitor. The one in which a plurality of capacitors are connected to each other may be used as the first capacitor 125. The above plurality of capacitors may be connected to each other in series or connected to each other in parallel, or a portion connected in series and a portion connected in parallel may mix together. In this case, the electrostatic capacitance $C_m$ of the first capacitor 125 is a synthetic capacitance of the above plurality of capacitors in the description of this embodiment.

Second Embodiment

Next, a second embodiment is described. In this embodiment, a power supply system capable of adjusting a current $I_{inv}$ outputted from the inverter unit 120 is described. Specifically, a transformer is disposed between an inverter unit 120, and a pseudo-resonant element 130 and an inductive load 180. In this embodiment as described above, the transformer is added to the power supply system of the first embodiment. Accordingly, in the description of this embodiment, the same parts as those of the first embodiment are denoted by the same reference signs as the reference signs denoted in FIG. 1 to FIG. 7, or the like, thereby omitting a detailed description. Further, also in this embodiment, similarly to the first embodiment, the description is made by citing a case where the pseudo-resonant element 130 is constituted of a second capacitor as the example.

Figure 8:
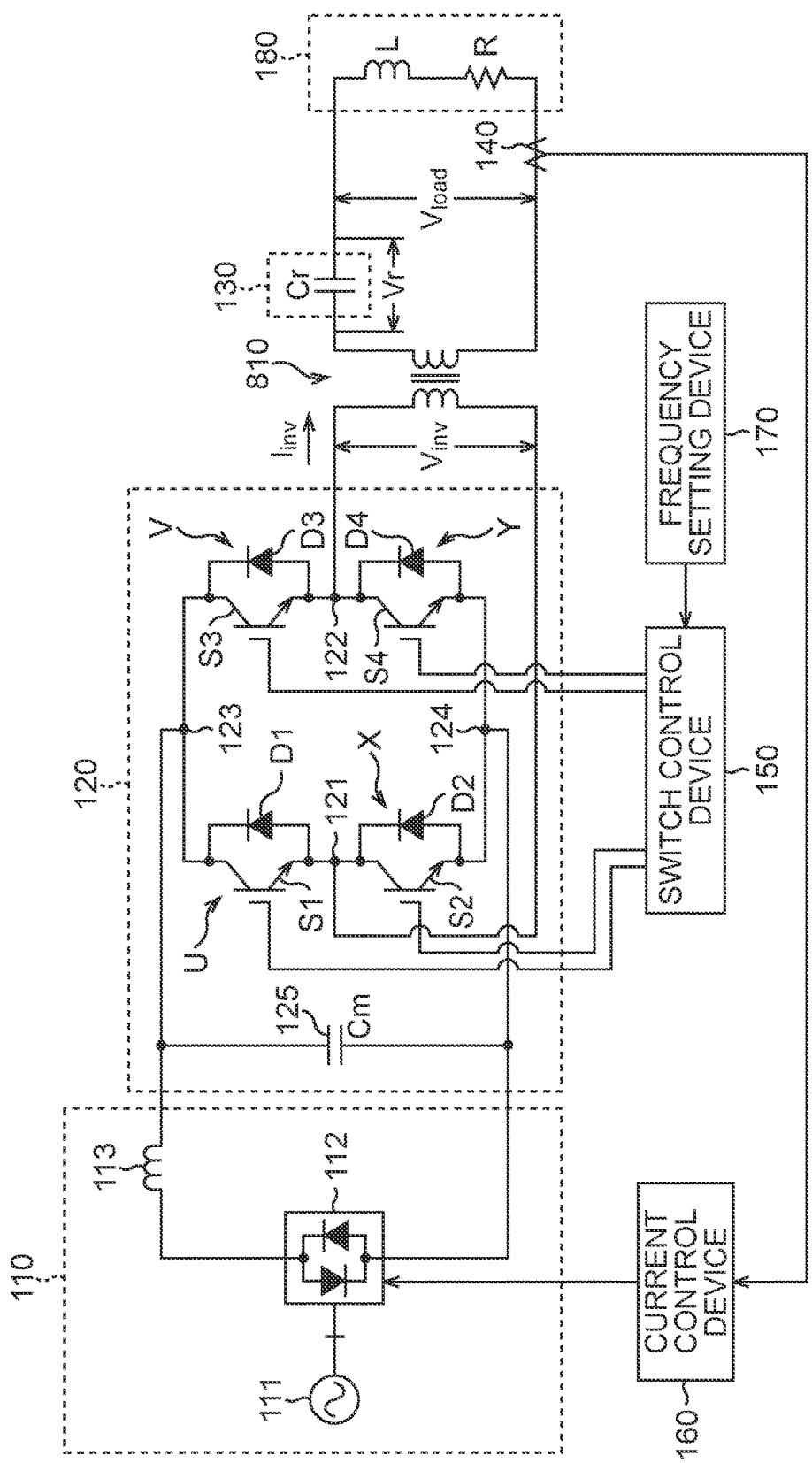
FIG. 8 is a view illustrating configuration of a power supply system according to a second embodiment.

FIG. 8 is a view illustrating one example of a configuration of a power supply system 800. The power supply system 800 has a transformer 810 in addition to a direct-current power supply unit 110, an inverter unit 120, a pseudo-resonant element 130, a current transformer 140, a switch control device 150, a current control device 160, and a frequency setting device 170. Note that the power supply system 800 does not have a specific device (oscillation suppression circuit) for suppressing an oscillating current.

The transformer 810 increases or decreases a voltage $V_{inv}$ outputted from the inverter unit 120. One end of a primary winding (winding on an input side) of the transformer 810 and a second alternating-current terminal 122 are connected to each other. The other end of the primary winding of the transformer 810 and a first alternating-current terminal 121 are connected to each other. One end of a secondary winding (winding on an output side) of the transformer 810 and one end of the pseudo-resonant element 130 are connected to each other. The other end of the secondary winding of the transformer 810 and the other end of the inductive load 180 are connected to each other. Note that one end of the inductive load 180 is connected to the other end of the pseudo-resonant element 130.

Here, a turns ratio of the transformer 810 is set as n. A turns ratio n is set as a value (n=the number of turns of the primary winding÷the number of turns of the secondary winding) obtained by dividing the number of turns of the primary winding of the transformer 810 by the number of turns of the secondary winding thereof. When the transformer 810 is a step-down transformer, the turns ratio n exceeds 1. When the transformer 810 is a step-up transformer, the turns ratio n is below 1.

Hereinafter, in order to simplify the description, the transformer 810 is set to be an ideal transformer. A primary voltage (voltage applied to the primary winding) of the transformer 810 is the voltage $V_{inv}$ outputted from the inverter unit 120. A secondary voltage (voltage generated in the secondary winding) of the transformer 810 is represented by the product ($=(1/n) V_{inv}$) of the primary voltage and a reciprocal of the turns ratio n. Further, a primary current (current flowing through the primary winding) of the transformer 810 is a current $I_{inv}$ outputted from the inverter unit 120. A secondary current (current flowing through the secondary winding) of the transformer 810 is represented by the product ($=n I_{inv}$) of the primary current and the turns ratio n. Accordingly, a current flowing through the inductive load 180 is n times the current $I_{inv}$ outputted from the inverter unit 120.

When the step-down transformer is used as the transformer 810, the current flowing through the inductive load 180 is larger than the current $I_{inv}$ outputted from the inverter unit 120. On the other hand, when the step-up transformer is used as the transformer 810, the current flowing through the inductive load 180 is smaller than the current $I_{inv}$ outputted from the inverter unit 120. Accordingly, in the power supply system 800 of this embodiment, the current flowing through the inductive load 180 can be adjusted by the turns ratio n of the transformer 810. When the step-down transformer is used as the transformer 810, it is possible to pass a large current through the inductive load 180 without passing a large current through the inverter unit 120. Consequently, for example, as a first switch U, a second switch X, a third switch V, a fourth switch Y, and a first capacitor 125, elements for large current need not be used.

An impedance Z when the inductive load 180 side is seen from an output end of the inverter unit 120 is represented by the next (20) expression.

[Mathematical Expression 15]

[Mathematical expression 15]

$$Z = n^2 R + j\left(\omega n^2 L - \frac{1}{\omega \frac{C_r}{n^2}}\right) \quad (20)$$

Here, R is a resistance [Ω] of the inductive load 180. L is an inductance [H] of the inductive load 180. $C_r$ is an electrostatic capacitance [F] of the second capacitor of the pseudo-resonant element 130. n is the turns ratio of the transformer 810. j is an imaginary unit.

As described in the first embodiment, the synthetic reactance ($=\omega \times L'$) of the pseudo-resonant element 130 and the inductive load 180 seen from the inverter unit 120 is represented by the (10) expression. Further, since the inductance L' of the apparent inductive load 210 is required to exceed "0" (zero), according to the (11) expression, the (12) expression is established. On the other hand, in this embodiment, a synthetic reactance ($=\omega \times L'$) of the pseudo-resonant element 130 and the inductive load 180 seen from the inverter unit 120 is the one indicated in parentheses of the second term in the right-hand side of the (20) expression. Consequently, in order that an inductance L' of the apparent inductive load 210 exceeds "0" (zero), it is necessary to satisfy the next (21) expression.

[Mathematical Expression 16]

[Mathematical expression 16]

$$\omega n^2 L - \frac{1}{\omega \frac{C_r}{n^2}} > 0 \quad (21)$$

According to the (21) expression, the (12) expression is established. That is, even though the transformer 810 is present, the electrostatic capacitance $C_r$ of the second capacitor of the pseudo-resonant element 130 is determined in the same manner as that in the first embodiment.

Further, according to the (20) expression, in this embodiment, the inductance L' of the apparent inductive load 210 is represented by the next (22) expression.

[Mathematical Expression 17]

[Mathematical expression 17]

$$L' = n^2 L - \frac{1}{\omega^2 \frac{C_r}{n^2}} \quad (22)$$

Accordingly, when the (22) expression is substituted for the (5) expression, the following (23) expression is established.

[Mathematical Expression 18]

[Mathematical expression 18]

$$C_m \leq \frac{1}{n^2 \omega^2 \left(L - \frac{1}{\omega^2 C_r}\right)} \quad (23)$$

Consequently, in this embodiment, it is sufficient that an electrostatic capacitance $C_m$ of the first capacitor 125 is designed so as to satisfy the (23) expression instead of the (17) expression.

Note that also in this embodiment, the modified example described in the first embodiment can be employed.

Third Embodiment

Next, a third embodiment is described. In the first embodiment and the second embodiment, the description has been made by citing a case where the magnetic energy recovery switch is constituted by the full-bridge circuit as the example. In contrast with this, in this embodiment, the description is made by citing a case where a magnetic energy recovery switch is constituted by a half-bridge circuit as an example. As described above, a configuration of the magnetic energy recovery switch of this embodiment is mainly different from those of the first embodiment and the second embodiment. Accordingly, in the description of this embodiment, the same parts as those of the first embodiment and the second embodiment are denoted by the same reference signs as the reference signs denoted in FIG. 1 to FIG. 8, or the like, thereby omitting a detailed description.

<Circuit Configuration>

Figure 9:
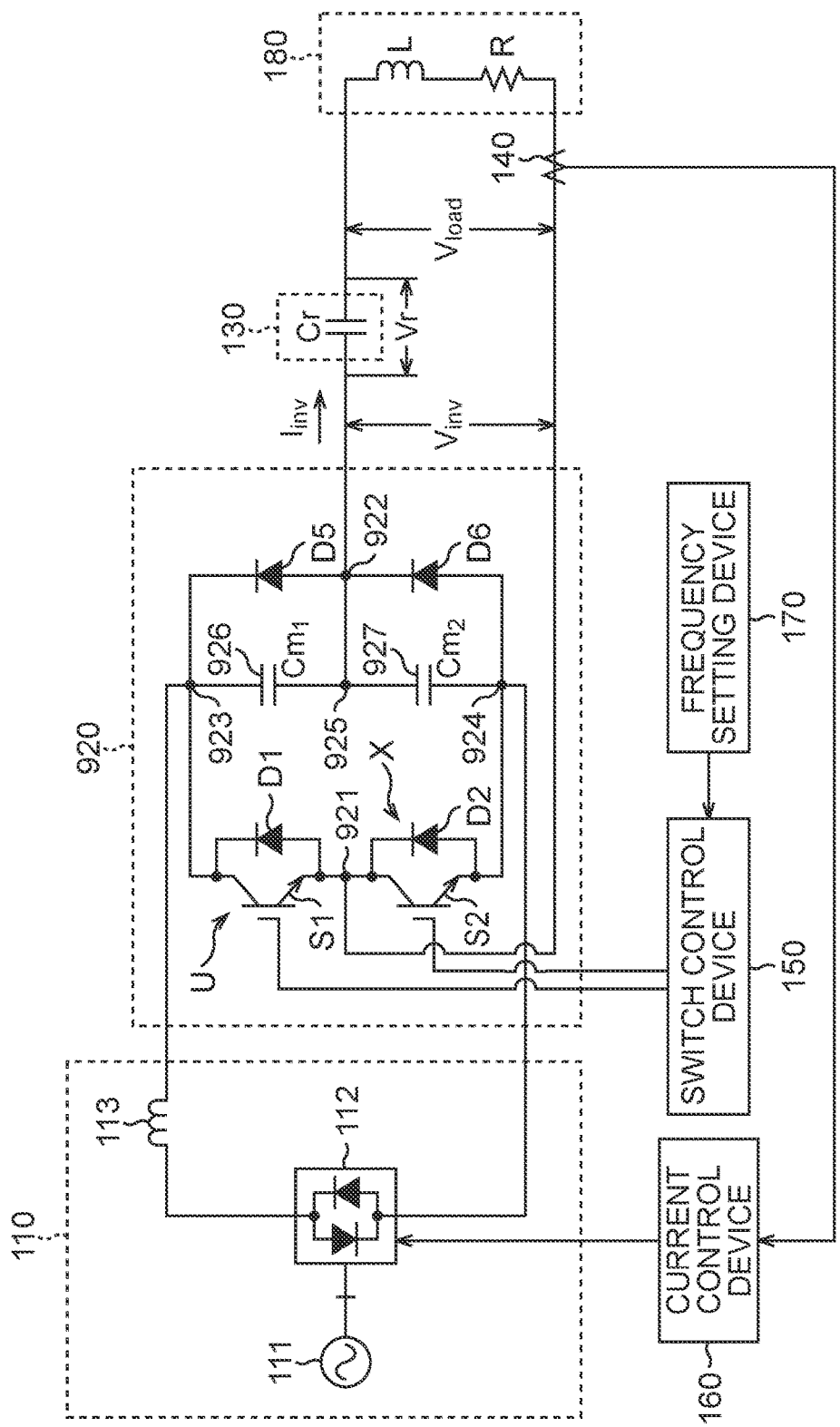
FIG. 9 is a view illustrating a configuration of a power supply system according to a third embodiment.

FIG. 9 is a view illustrating one example of a configuration of a power supply system 900. The power supply system 900 has a direct-current power supply unit 110, an inverter unit 920, a pseudo-resonant element 130, a current transformer 140, a switch control device 150, a current control device 160, and a frequency setting device 170. Note that the power supply system 900 does not have a specific device (oscillation suppression circuit) for suppressing an oscillating current.

[Inverter Unit 920]

The inverter unit 920 converts direct-current power outputted from the direct-current power supply unit 110 into alternating-current power with the same frequency as a switching frequency at which each switch of the inverter unit 920 is switched, similarly to the inverter units 120 of the first embodiment and the second embodiment. Then, the inverter unit 920 supplies the alternating-current power with the frequency to an inductive load 180. The inverter unit 920 has a magnetic energy recovery switch.

One example of a configuration of the inverter unit 920 (magnetic energy recovery switch) of this embodiment is described.

The inverter unit 920 has a first switch U, a second switch X, a first diode D5, a second diode D6, a first alternating-current terminal 921, second alternating-current terminals 922, 925, a first direct-current terminal 923, a second direct-current terminal 924, and a plurality of first capacitors. In this embodiment, the inverter unit 920 has a high-side capacitor 926 and a low-side capacitor 927 as the plurality of first capacitors.

The first switch U is the same as the first switch U described in the first embodiment. The second switch X is the same as the second switch X described in the first embodiment. Accordingly, here, a detailed description of the first switch U and the second switch X is omitted. Similarly to the first embodiment, a connection point of an end portion on a forward direction side of each of free-wheeling diodes D1 and D2 and an end portion on a backward side to a forward direction of each of self-arc-extinguishing elements S1 and S2 is set as a negative electrode terminal. A connection point of an end portion on a forward direction side of each of the self-arc-extinguishing elements S1 and S2 and an end portion on a backward side to a forward direction of each of the free-wheeling diodes D1 and D2 is set as a positive electrode terminal.

The diodes D5 and D6 each have a first end portion and a second end portion. The diodes D5 and D6 each have only a state of passing a current from the first end portion to the second end portion but not passing a current from the second end portion to the first end portion as a conduction state. A direction from the first end portion to the second end portion of each of the diodes D5 and D6 is set as a forward direction in each of the diodes D5 and D6. The first end portion of each of the diodes D5 and D6 is set as a negative electrode terminal. The second end portion of each of the diodes D5 and D6 is set as a positive electrode terminal.

A connection configuration of each part of the inverter unit 920 is described.

The negative electrode terminal of the first switch U and the positive electrode terminal of the second switch X are connected to each other. The negative electrode terminal of the first diode D5 and the positive electrode terminal of the second diode D6 are connected to each other. The positive electrode terminal of the first switch U and the positive electrode terminal of the first diode D5 are connected to each other. The negative electrode terminal of the second switch X and the negative electrode terminal of the second diode D6 are connected to each other.

The first alternating-current terminal 921 is connected to a connection point of the negative electrode terminal of the first switch U and the positive electrode terminal of the second switch X. The second alternating-current terminals 922 and 925 are connected to a connection point of the negative electrode terminal of the first diode D5 and the positive electrode terminal of the second diode D6. To the second alternating-current terminals 922 and 925, one end of the pseudo-resonant element 130 is connected. In this embodiment, the first alternating-current terminal 921 and the second alternating-current terminals 922 and 925 are output ends of the inverter unit 920. Note that in FIG. 9, the two second alternating-current terminals 922 and 925 are illustrated as a matter of convenience of a notation, but these can be regarded as one terminal.

The first direct-current terminal 923 is connected to a connection point of the positive electrode terminal of the first switch U and the positive electrode terminal of the first diode D5. To the first direct-current terminal 923, the other end of a reactor 113 is connected. The second direct-current terminal 924 is connected to a connection point of the negative electrode terminal of the second switch X and the negative electrode terminal of the second diode D6. To the second direct-current terminal 924, the other end on an output side of a rectifier 112 is connected. In this embodiment, the first direct-current terminal 923 and the second direct-current terminal 924 are input ends of the inverter unit 920. The direct-current power supply unit 110 is connected between the first direct-current terminal 923 and the second direct-current terminal 924 as described above.

The high-side capacitor 926 is connected between the connection point of the positive electrode terminal of the first switch U and the positive electrode terminal of the first diode D5 and the connection point of the negative electrode terminal of the first diode D5 and the positive electrode terminal of the second diode D6. As described above, to the connection point of the positive electrode terminal of the first switch U and the positive electrode terminal of the first diode D5, the first direct-current terminal 923 is also connected. Further, to the connection point of the negative electrode terminal of the first diode D5 and the positive electrode terminal of the second diode D6, the second alternating-current terminal 922 is also connected. The high-side capacitor 926 is a capacitor having polarity.

The low-side capacitor 927 is connected between the connection point of the negative electrode terminal of the second switch X and the negative electrode terminal of the second diode D6 and the connection point of the negative electrode terminal of the first diode D5 and the positive electrode terminal of the second diode D6. As described above, to the connection point of the negative electrode terminal of the second switch X and the negative electrode terminal of the second diode D6, the second direct-current terminal 924 is also connected. Further, to the connection point of the negative electrode terminal of the first diode D5 and the positive electrode terminal of the second diode D6, one end of the high-side capacitor 926 is connected. That is, one end of the high-side capacitor 926 which is one first capacitor and one end of the low-side capacitor 927 which is the other first capacitor, of the high-side capacitor 926 and the low-side capacitor 927 constituting the plurality of first capacitors, are connected to each other. The low-side capacitor 927 is a capacitor having polarity.

[Inductive Load 180]

An inductive load 180 is connected in series with respect to the high-side capacitor 926 and the low-side capacitor 927 between the first alternating-current terminal 921 and the second alternating-current terminals 922 and 925 of the inverter unit 920. In the example illustrated in FIG. 9, one end of the inductive load 180 and the other end of the pseudo-resonant element 130 are connected to each other.

The other end of the inductive load 180 and the first alternating-current terminal 921 of the inverter unit 920 are connected to each other. The inductive load 180 is connected between the first alternating-current terminal 921 and the second alternating-current terminals 922 and 925 as described above. Further, the pseudo-resonant element 130 is connected in series with respect to the inductive load 180 between the first alternating-current terminal 921 and the second alternating-current terminals 922 and 925.

<Operation of Inverter Unit 920>

Figure 11A:
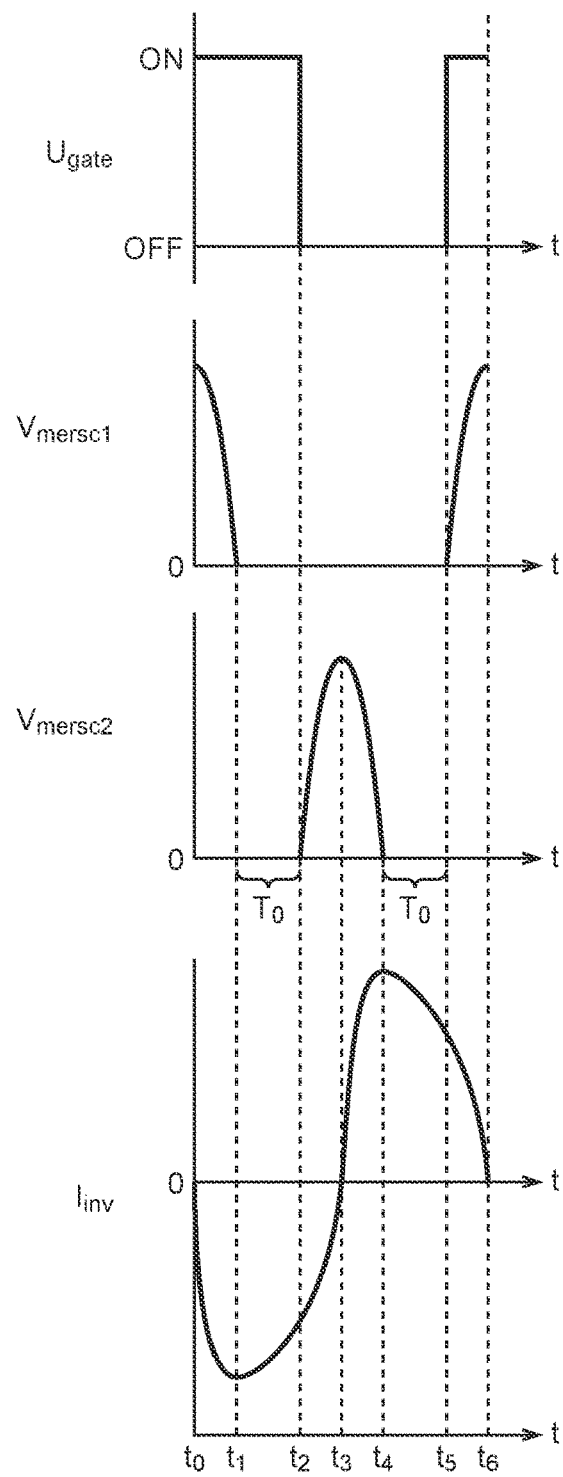
FIG. 11A is a chart explaining a first example of a relationship among a switching signal of a first switch, a voltage applied to a high-side capacitor, a voltage applied to a low-side capacitor, and a current outputted from the inverter unit.
Figure 11B:
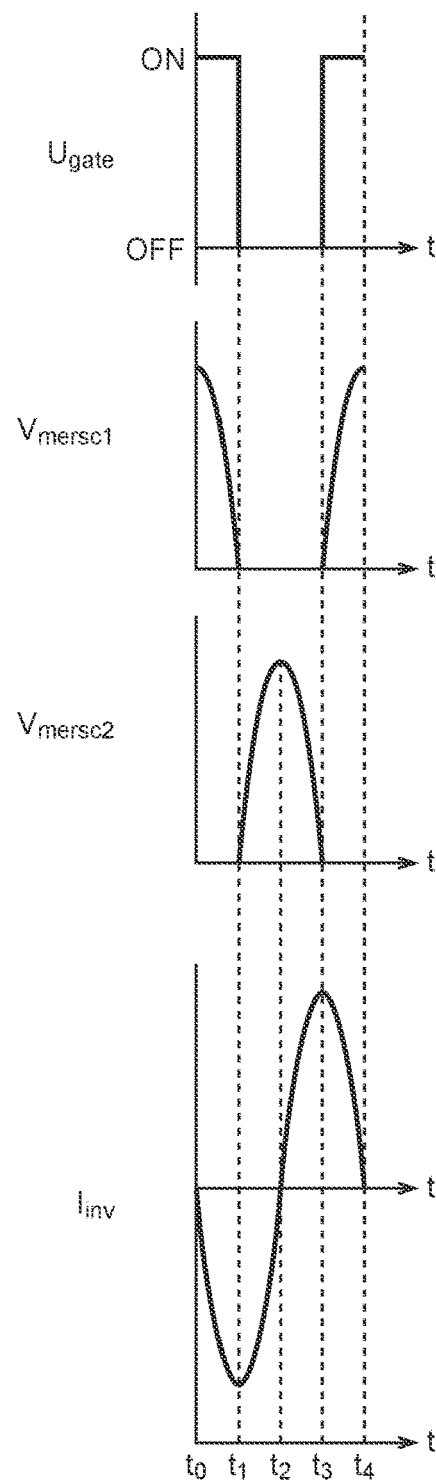
FIG. 11B is a chart explaining a second example of a relationship among a switching signal of the first switch, a voltage applied to the high-side capacitor, a voltage applied to the low-side capacitor, and a current outputted from the inverter unit.

Next, one example of an operation of the inverter unit 920 is described. FIG. 10 is a view explaining one example of a flow of a current in the inverter unit 920. FIG. 11A is a chart explaining a first example of a relationship among a switching signal $U_{gate}$ of the first switch U, a voltage $V_{mersc1}$ applied to the high-side capacitor 926, a voltage $V_{mersc2}$ applied to the low-side capacitor 927, and a current $I_{inv}$ outputted from the inverter unit 920. FIG. 11B is a chart explaining a second example of a relationship among a switching signal $U_{gate}$ of the first switch U, a voltage $V_{mersc1}$ applied to the high-side capacitor 926, a voltage $V_{mersc2}$ applied to the low-side capacitor 927, and a current $I_{inv}$ outputted from the inverter unit 920.

First, one example of an operation of the inverter unit 920 when a time period $T_0$ in which the voltages $V_{mersc1}$ and $V_{mersc2}$ applied to the high-side capacitor 926 and the low-side capacitor 927 remain "0" (zero) exceeds "0" (zero) is described.

An initial state is set as a state in which the high-side capacitor 926 is charged, a discharge of the low-side capacitor 927 finishes, the first switch U is on, and the second switch X is off.

As illustrated in a state A in FIG. 10, when the high-side capacitor 926 starts discharging, a current discharged from the high-side capacitor 926 goes to the first direct-current terminal 923. Since the first switch U is on, the current flowing into the first direct-current terminal 923 flows via the first switch U toward the first alternating-current terminal 921. Then, since the second switch X is off, the current flowing into the first alternating-current terminal 921 cannot flow through the positive electrode terminal side of the second switch X and flows toward the inductive load 180 and the pseudo-resonant element 130. The current passing the pseudo-resonant element 130 flows into the second alternating-current terminal 922, and goes back to the high-side capacitor 926.

Changes of voltages applied to the high-side capacitor 926 and the low-side capacitor 927 after the high-side capacitor 926 starts discharging and a change of a current outputted from the inverter unit 920 are described using FIG. 11A. $U_{gate}$ is a signal which the switch control device 150 transmits to the first switch U, and an on and off switching signal of the first switch U. Note that when the switching signal $U_{gate}$ indicates an on value, the first switch U is in an on state, and when the switching signal $U_{gate}$ indicates an off value, the first switch U is in an off state. Further, although an illustration is omitted here, the switch control device 150 also transmits a switching signal $X_{gate}$ to the second switch X. A value of the switching signal $X_{gate}$ indicates a value opposite to the switching signal transmitted to the first switch U. That is, the value of the switching signal $X_{gate}$ indicates an off value when the switching signal $U_{gate}$ indicates the on value, and it indicates an on value when the switching signal $U_{gate}$ indicates the off value. $V_{mersc1}$ indicates a voltage applied to the high-side capacitor 926. $V_{mersc2}$ indicates a voltage applied to the low-side capacitor 927. $I_{inv}$ indicates a current outputted from the inverter unit 920. $t_0$ indicates a time at which the high-side capacitor 926 starts discharging.

When the high-side capacitor 926 starts discharging, the current $I_{inv}$ outputted from the inverter unit 920 increases in a minus direction, and the voltage $V_{mersc1}$ applied to the high-side capacitor 926 starts decreasing. When the high-side capacitor 926 finishes discharging, the voltage $V_{mersc1}$ applied to the high-side capacitor 926 becomes "0" (zero). $t_1$ indicates a time at which the high-side capacitor 926 finishes discharging. At the time $t_0$, the discharge of the low-side capacitor 927 finishes. Further, in a time period of the time $t_0$ to a time $t_1$, a current does not flow through the low-side capacitor 927. Accordingly, the voltage $V_{mersc2}$ applied to the low-side capacitor 927 in this time period is "0" (zero).

At the time $t_1$, when the discharge of the high-side capacitor 926 finishes, the current $I_{inv}$ outputted from the inverter unit 920 reaches a peak value, and the voltage $V_{mersc1}$ of the high-side capacitor 926 becomes "0" (zero). Accordingly, a voltage between the first direct-current terminal 923 and the second direct-current terminal 924 becomes "0" (zero). In this case, as illustrated in a state B in FIG. 10, the current flowing into the second alternating-current terminal 922 goes via the diode D5 to the first direct-current terminal 923, and goes via the first switch U to the first alternating-current terminal 921. In this case, the voltages $V_{mersc1}$ and $V_{mersc2}$ applied to the high-side capacitor 926 and the low-side capacitor 927 are "0" (zero). Accordingly, voltages applied to the first switch U and the second switch X also are "0" (zero). The time period in which the voltages $V_{mersc1}$ and $V_{mersc2}$ applied to the high-side capacitor 926 and the low-side capacitor 927 are "0" (zero) is set as $T_0$.

In a state B in FIG. 10, the current flowing through the inverter unit 920 and the inductive load 180 gradually decreases according to a time constant determined from an inductance and a resistance component of the inductive load 180. As illustrated in FIG. 11A, the current $I_{inv}$ outputted from the inverter unit 920 decreases in the time period of the time $t_1$ to a time $t_2$.

The switch control device 150 switches the first switch U to off and the second switch X to on at the time $t_2$ at which the time period $T_0$ passes from the time $t_1$ at which the discharge of the high-side capacitor 926 finishes. At this time, the voltages $V_{mersc1}$ and $V_{mersc2}$ applied to the high-side capacitor 926 and the low-side capacitor 927 are "0" (zero), thereby resulting in soft switching.

When the first switch U is switched to off and the second switch X is switched to on, the current flowing into the second alternating-current terminals 922 and 925 goes to the low-side capacitor 927 since the first switch U is off as illustrated in a state C in FIG. 10. The current flowing into the low-side capacitor 927 is utilized for a charge of the low-side capacitor 927, and gradually decreases. This current flows as illustrated in the state C in FIG. 10 until the low-side capacitor 927 finishes charging, and becomes "0" (zero) at a time point at which the charge of the low-side capacitor 927 finishes. In FIG. 11A, the low-side capacitor 927 finishes charging at a time $t_3$.

As illustrated in FIG. 11A, the voltage $V_{mersc2}$ applied to the low-side capacitor 927 rises between the time $t_2$ and the time $t_3$. Further, in accordance with a rise in the voltage $V_{mersc2}$ applied to the low-side capacitor 927, the current $I_{inv}$ outputted from the inverter unit 920 decreases. When the charge of the low-side capacitor 927 finishes at the time $t_3$, the voltage $V_{mersc2}$ applied to the low-side capacitor 927 reaches a peak value. At this time, the current $I_{inv}$ outputted from the inverter unit 920 becomes "0" (zero). At the time $t_1$, the discharge of the high-side capacitor 926 finishes. Further, in a time period of the time $t_1$ to the time $t_3$, a current does not flow through the high-side capacitor 926. Accordingly, the voltage $V_{mersc1}$ applied to the high-side capacitor 926 in this time period is "0" (zero).

After the charge of the low-side capacitor 927 finishes, the low-side capacitor 927 starts discharging. As illustrated in a state D in FIG. 10, the current discharged from the low-side capacitor 927 goes to the second alternating-current terminals 922 and 925. Since the first switch U is off, this current flows into the pseudo-resonant element 130 and the inductive load 180. The current flowing into the inductive load 180 goes to the first alternating-current terminal 921, and flows into the first alternating-current terminal 921. The current flowing into the first alternating-current terminal 921 goes via the second switch X back to the low-side capacitor 927 since the first switch U is off and the second switch X is on. That is, a direction of the current flowing into the pseudo-resonant element 130 and the inductive load 180 is opposite to those in the states A to C. Thus, by switching on and off of the first switch U and the second switch X at a switching frequency f set by the switch control device 150, the inverter unit 920 outputs the current $I_{inv}$ with the same frequency as the switching frequency f.

In FIG. 11A, the low-side capacitor 927 finishes discharging at a time $t_4$. As illustrated in FIG. 11A, the voltage $V_{mersc2}$ applied to the low-side capacitor 927 continues decreasing from the time $t_3$ in accordance with the discharge of the low-side capacitor 927, and becomes "0" (zero) at the time $t_4$. Further, the current $I_{inv}$ outputted from the inverter unit 920 increases in a direction opposite to a direction in the time $t_0$ to the time $t_3$ in accordance with the discharge of the low-side capacitor 927. Then, the current $I_{inv}$ outputted from the inverter unit 920 reaches a peak value in a direction opposite to a direction in the time $t_0$ to the time $t_3$ at the time $t_4$ at which the discharge of the low-side capacitor 921 finishes.

A direction of the current $I_{inv}$ outputted from the inverter unit 920 between the time $t_3$ and the time $t_4$ is opposite compared with that of the current $I_{inv}$ outputted from the inverter unit 920 between the time $t_0$ and the time $t_1$. Therefore, in a graph in FIG. 11A, a value of the current $I_{inv}$ outputted from the inverter unit 920 between the time $t_3$ and the time $t_4$ is a plus value. Note that also in a time period of the time $t_3$ to the time $t_4$, because a current does not flow through the high-side capacitor 926, the voltage $V_{mersc1}$ applied to the high-side capacitor 926 is "0" (zero).

At the time $t_4$, when the discharge of the low-side capacitor 927 finishes, the voltage $V_{mersc2}$ applied to the low-side capacitor 927 becomes "0" (zero). Accordingly, a voltage between the first direct-current terminal 923 and the second direct-current terminal 924 becomes "0" (zero). In this case, as illustrated in a state E in FIG. 10, the current flowing into the first alternating-current terminal 921 goes via the second switch X to the second direct-current terminal 924, and goes via the second diode D6 to the second alternating-current terminal 922.

In the state E in FIG. 10, the current flowing through the inverter unit 920 and the inductive load 180 gradually approaches "0" (zero) according to the time constant based on the inductance and the resistance component of the inductive load 180. As illustrated in FIG. 11A, the current $I_{inv}$ outputted from the inverter unit 920 approaches "0" (zero) in the time period of the time $t_4$ to a time $t_5$.

The switch control device 150 switches the first switch U to on and switches the second switch X to off at the time $t_5$ at which the time period $T_0$ passes from the time $t_4$ at which the discharge of the low-side capacitor 927 finishes. At this time, the voltages $V_{mersc1}$ and $V_{mersc1}$ applied to the high-side capacitor 926 and the low-side capacitor 927 are "0" (zero), thereby resulting in the soft switching.

When the first switch U is switched to on and the second switch X is switched to off, the current flowing into the first alternating-current terminal 921 goes via the first switch U to the first direct-current terminal 923 since the first switch U is on and the second switch X is off as illustrated in a state F in FIG. 10. The current flowing into the first direct-current terminal 923 goes to the high-side capacitor 926. The current flowing into the high-side capacitor 926 approaches "0" (zero) further. This current flows as illustrated in the state F in FIG. 10 until the charge of the high-side capacitor 926 finishes, and becomes "0" (zero) at the time point at which the charge of the high-side capacitor 926 finishes.

As illustrated in FIG. 11A, the voltage $V_{mersc1}$ applied to the high-side capacitor 926 rises between the time $t_5$ and a time $t_6$. Further, in accordance with a rise in the voltage $V_{mersc1}$ applied to the high-side capacitor 926, the current $I_{inv}$ outputted from the inverter unit 920 approaches "0" (zero). When the charge of the high-side capacitor 926 finishes at the time $t_6$, the voltage $V_{mersc1}$ applied to the high-side capacitor 926 reaches a peak value. At this time, the current $I_{inv}$ outputted from the inverter unit 920 becomes "0" (zero). At the time $t_4$, the discharge of the low-side capacitor 927 finishes. Further, in a time period of the time $t_4$ to the time $t_6$, a current does not flow through the low-side capacitor 927. Accordingly, the voltage $V_{mersc2}$ applied to the low-side capacitor 927 in this time period is "0" (zero).

At the time $t_6$, when the charge of the high-side capacitor 926 finishes, the first switch U is on and the second switch X is off, thereby returning to the state A which is the initial state. The inverter unit 920 repeats the above operation.

As illustrated in the state C in FIG. 10, at a time of the charge of the low-side capacitor 927, the current flows from the second alternating-current terminals 922 and 925 into the low-side capacitor 927. Further, as illustrated in the state F in FIG. 10, at a time of the charge of the high-side capacitor 926, the current flows from the first direct-current terminal 923 into the high-side capacitor 926. That is, in the high-side capacitor 926, necessarily, a positive electric charge accumulates on the first direct-current terminal 923 side and a negative electric charge accumulates on the second alternating-current terminal 922 and 925 sides. In the low-side capacitor 927, necessarily, a positive electric charge accumulates on the second alternating-current terminal 922 and 925 sides and a negative electric charge accumulates on the second direct-current terminal 924 side. Therefore, as the high-side capacitor 926 and the low-side capacitor 927, capacitors having polarity can be used. Further, a direction of a current flowing into a second capacitor included in the pseudo-resonant element 130 is not fixed. Therefore, as the second capacitor, the capacitor having polarity cannot be used, but a nonpolar capacitor is used.

As illustrated in FIG. 11A, as the current $I_{inv}$ outputted from the inverter unit 920, the current for one cycle of the alternating current is outputted. That is, the inverter unit 920 outputs the alternating current with the same frequency as the switching frequency f. In this embodiment, the switching frequency at which the first switch U and the second switch X are switched is an output frequency of the magnetic energy recovery switch.

FIG. 11A illustrates a case where the time period $T_0$ in which the voltages $V_{mersc1}$ and $V_{mersc2}$ applied to the high-side capacitor 926 and the low-side capacitor 927 remain "0" (zero) exceeds (zero). In contrast with this, FIG. 11B illustrates a case where the time period $T_0$ in which the voltages $V_{mersc1}$ and $V_{mersc2}$ applied to the high-side capacitor 926 and the low-side capacitor 927 remain "0" (zero) is "0" (zero). Hereinafter, one example of an operation of the inverter unit 920 when the time period $T_0$ in which the voltages $V_{mersc1}$ and $V_{mersc2}$ applied to the high-side capacitor 926 and the low-side capacitor 927 remain "0" (zero) is "0" (zero) is described.

An initial state is set as a state in which the high-side capacitor 926 is charged, the discharge of the low-side capacitor 927 finishes, the first switch U is on, and the second switch X is off.

When the time period $T_0$ in which the voltages $V_{mersc1}$ and $V_{mersc2}$ applied to the high-side capacitor 926 and the low-side capacitor 927 remain "0" (zero) is "0" (zero), the high-side capacitor 926 performs the discharge between the time $t_0$ and the time $t_1$ as illustrated in FIG. 11B. Then, the voltage $V_{mersc1}$ applied to the high-side capacitor 926 becomes "0" (zero) at the time $t_1$. The operation of the inverter unit 920 between the time $t_0$ and the time $t_1$ illustrated in FIG. 11B is the same as the operation of the inverter unit 920 between the time $t_0$ and the time $t_1$ illustrated in FIG. 11A.

In the example illustrated in FIG. 11A, the time period $T_0$ in which the voltages $V_{mersc1}$ and $V_{mersc2}$ applied to the high-side capacitor 926 and the low-side capacitor 927 remain "0" (zero) is set after the time $t_1$. In contrast with this, in the example illustrated in FIG. 11B, the time period $T_0$ in which the voltages $V_{mersc1}$ and $V_{mersc2}$ applied to the high-side capacitor 926 and the low-side capacitor 927 remain "0" (zero) is "0" (zero). Accordingly, the switch control device 150 switches the first switch U to off and switches the second switch X to on at the time $t_1$ at which the discharge of the high-side capacitor 926 finishes (namely, without keeping time from when the discharge of the high-side capacitor 926 finishes).

In that case, the low-side capacitor 927 performs the charge between the time $t_1$ and the time $t_2$, and performs the discharge between the time $t_2$ and the time $t_3$. Then, the voltage $V_{mersc2}$ applied to the low-side capacitor 927 becomes "0" (zero) at the time $t_3$. In the example illustrated in FIG. 11B as described above, the first switch U and the second switch X change from the state A to the state C in FIG. 10, and do not change to the state B. The operation of the inverter unit 920 between the time $t_1$ and the time $t_3$ illustrated in FIG. 11B is the same as the operation of the inverter unit 920 between the time $t_2$ and the time $t_4$ illustrated in FIG. 11A.

Thereafter, in the example illustrated in FIG. 11A, the time period $T_0$ in which the voltage $V_{mersc2}$ applied to the low-side capacitor 927 remains "0" (zero) is set. In contrast with this, in the example illustrated in FIG. 11B, the time period $T_0$ in which the voltage $V_{mersc2}$ applied to the low-side capacitor 927 remains "0" (zero) is "0" (zero). Accordingly, the switch control device 150 switches the first switch U to on and switches the second switch X to off at the time $t_3$ at which the discharge of the low-side capacitor 927 finishes (namely, without keeping time from when the discharge of the low-side capacitor 927 finishes).

In that case, the high-side capacitor 926 performs the charge between the time $t_3$ and the time $t_4$. In the example illustrated in FIG. 11B as described above, the first switch U and the second switch X change from the state D to the state F in FIG. 10, and do not change to the state E. The operation of the inverter unit 920 between the time $t_3$ and the time $t_4$ illustrated in FIG. 11B is the same as the operation of the inverter unit 920 between the time $t_5$ and the time $t_6$ illustrated in FIG. 11A.

As illustrated in FIG. 11B, from the time $t_0$, the current $I_{inv}$ outputted from the inverter unit 920 increases in a minus direction with the discharge of the high-side capacitor 926. Then, the current $I_{inv}$ outputted from the inverter unit 920 reaches a peak value at the time $t_1$ at which the discharge of the high-side capacitor 926 finishes. From the time $t_1$, the current $I_{inv}$ outputted from the inverter unit 920 approaches "0" (zero) with the charge of the low-side capacitor 927. Then, the current $I_{inv}$ outputted from the inverter unit 920 becomes "0" (zero) at the time $t_2$ at which the charge of the low-side capacitor 927 finishes.

From the time $t_2$, the direction of the current $I_{inv}$ outputted from the inverter unit 920 is opposite to the direction in the time $t_0$ to the time $t_2$. From the time $t_2$, the current $I_{inv}$ outputted from the inverter unit 920 increases in the direction opposite to the direction in the time $t_0$ to the time $t_2$ with the discharge of the low-side capacitor 927. Then, the current $I_{inv}$ outputted from the inverter unit 920 reaches a peak value in the direction opposite to the direction in the time $t_0$ to the time $t_2$ at the time $t_3$ at which the discharge of the low-side capacitor 927 finishes. From the time $t_3$, The current $I_{inv}$ outputted from the inverter unit 920 approaches "0" (zero) with the charge of the high-side capacitor 926. Then, the current $I_{inv}$ outputted from the inverter unit 920 becomes "0" (zero) at the time $t_4$ at which the charge of the high-side capacitor 926 finishes.

The switch control device 150 switches on and off between the first switch U and the second switch X at the time $t_1$ and the time $t_3$ at which the voltages $V_{mersc1}$ and $V_{mersc2}$ applied to the high-side capacitor 926 and the low-side capacitor 927 become "0" (zero). This allows the switch control device 150 to achieve the soft switching even when the time period $T_0$ in which the voltages $V_{mersc1}$ and $V_{mersc2}$ applied to the high-side capacitor 926 and the low-side capacitor 927 remain "0" (zero) is "0" (zero).

Further, the time period taken to charge and the time period taken to discharge the high-side capacitor 926 and the low-side capacitor 927 are a half cycle of a resonance frequency determined from electrostatic capacitances $C_{m1}$ and $C_{m2}$ of the high-side capacitor 926 and the low-side capacitor 927, and the inductance L' of the apparent inductive load 210. Therefore, as illustrated in FIG. 11B, when the time period $T_0$ in which the voltages $V_{mersc1}$ and $V_{mersc2}$ applied to the high-side capacitor 926 and the low-side capacitor 927 remain "0" (zero) is "0" (zero), a frequency of the current $I_{inv}$ outputted from the inverter unit 920 is equal to the resonance frequency determined from each of the electrostatic capacitances $C_{m1}$ and $C_{m2}$ of the high-side capacitor 926 and the low-side capacitor 927, and the inductance L' of the apparent inductive load 210.

As is apparent from the above description, by switching on and off between the first switch U and the second switch X, the high-side capacitor 926 and the low-side capacitor 927 and the pseudo-resonant element 130 are disposed in series on a path of the alternating current flowing through part of the first switch U and the second switch X.

A design of the electrostatic capacitances $C_{m1}$ and $C_{m2}$ of the high-side capacitor 926 and the low-side capacitor 927 can be achieved by replacing the electrostatic capacitance $C_m$ of the first capacitor 125 described in the first embodiment with each of the electrostatic capacitances $C_{m1}$ and $C_{m2}$ of the high-side capacitor 926 and the low-side capacitor 927. For example, when both the electrostatic capacitances $C_{m1}$ and $C_{m2}$ of the high-side capacitor 926 and the low-side capacitor 927 are set as $C_m$, the electrostatic capacitances $C_{m1}$ and $C_{m2}$ of the high-side capacitor 926 and the low-side capacitor 927 are determined in the same manner as that in the electrostatic capacitance $C_m$ of the first capacitor 125 described in the first embodiment.

That is, the electrostatic capacitances $C_{m1}$ and $C_{m2}$ of the high-side capacitor 926 and the low-side capacitor 927 are required to satisfy the following (24) expression and (25) expression. The power supply system 900 is required to have the high-side capacitor 926 and the low-side capacitor 927, the pseudo-resonant element 130, and the inductive load 180 such as to satisfy the (24) expression and the (25) expression when the switching frequency of the inverter unit 920 is f.

[Mathematical Expression 19]

[Mathematical expression 19]

$$f_{res} = \frac{1}{2\pi\sqrt{L'C_{m1}}} \geq f \quad (24)$$

$$f_{res} = \frac{1}{2\pi\sqrt{L'C_{m2}}} \geq f \quad (25)$$

(Method of Reducing Power Supply Capacity of Inverter Unit 920)

An electrostatic capacitance $C_r$ of the second capacitor of the pseudo-resonant element 130 and the electrostatic capacitances $C_{m1}$ and $C_{m2}$ of the high-side capacitor 926 and the low-side capacitor 927 are the ones in which the electrostatic capacitance $C_m$ of the first capacitor 125 is replaced with each of the electrostatic capacitances $C_{m1}$ and $C_{m2}$ of the high-side capacitor 926 and the low-side capacitor 927 in the section (Method of reducing power supply capacity of inverter unit 120) described in the first embodiment.

That is, it is sufficient that the electrostatic capacitances $C_{m1}$ and $C_{m2}$ of the high-side capacitor 926 and the low-side capacitor 927 satisfy the next (26) expression and (27) expression.

[Mathematical Expression 20]

[Mathematical expression 20]

$$C_{m1} \leq \frac{1}{\omega^2\left(L - \frac{1}{\omega^2 C_r}\right)} \quad (26)$$

$$C_{m2} \leq \frac{1}{\omega^2\left(L - \frac{1}{\omega^2 C_r}\right)} \quad (27)$$

In other words, it is sufficient that each of the electrostatic capacitances $C_{m1}$ and $C_{m2}$ of the high-side capacitor 926 and the low-side capacitor 927 satisfies the (17) expression described in the first embodiment. Further, it is sufficient that the electrostatic capacitance $C_r$ of the second capacitor of the pseudo-resonant element 130 satisfies the (19) expression described in the first embodiment.

As described above, even though the magnetic energy recovery switch is constituted by the half-bridge circuit, the effect described in the first embodiment can be obtained.

Note that also in this embodiment, the modified example described in the first embodiment can be employed. Further, this embodiment may be applied to the second embodiment.

In this case, each of the electrostatic capacitances $C_{m1}$ and $C_{m2}$ of the high-side capacitor 926 and the low-side capacitor 927 is set to satisfy the (23) expression described in the second embodiment.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention can be utilized for energization, heating, or the like by alternating-current power.

The invention claimed is:

1. A power supply system comprising: a magnetic energy recovery switch; a frequency setting device; a control device; and a pseudo-resonant element, converting direct-current power into alternating-current power, and supplying the alternating-current power to an inductive load,
   wherein the magnetic energy recovery switch comprises: one or a plurality of first capacitors; and a plurality of switches,
   wherein the frequency setting device sets an output frequency of the magnetic energy recovery switch,
   wherein the control device controls an on and off operation of the plurality of switches based on an output frequency set by the frequency setting device,
   wherein the magnetic energy recovery switch recoveries magnetic energy stored in the inductive load and stores the magnetic energy as electrostatic energy in the first capacitor, and supplies the stored electrostatic energy to the inductive load, by on and off of the plurality of switches,
   wherein the pseudo-resonant element is constituted of at least one passive element including a second capacitor,
   wherein the first capacitor is disposed in series with respect to the inductive load,
   wherein the second capacitor is connected in series with respect to the inductive load on the inductive load side rather than an output end of the magnetic energy recovery switch,
   wherein a value of an inductive reactance on the inductive load side rather than an output end of the magnetic energy recovery switch exceeds a value of a capacitive reactance on the inductive load side rather than an output end of the magnetic energy recovery switch, and
   wherein the plurality of switches switch on and off when a voltage of both ends of the first capacitor is "0" (zero).

2. The power supply system according to claim 1, wherein a value of a synthetic reactance of an inductive reactance of the pseudo-resonant element and an inductive reactance of the inductive load exceeds a value of a capacitive reactance of the pseudo-resonant element.

3. The power supply system according to claim 1, wherein a value of an electrostatic capacitance of the second capacitor is a value exceeding a reciprocal of a value obtained by multiplying a synthetic inductance of an inductance of the pseudo-resonant element and an inductance of the inductive load, and a square of an angular frequency when a frequency for on and off of the switch is the output frequency.

4. The power supply system according to claim 1,
   wherein the output frequency is equal to or less than a resonance frequency, and wherein the resonance frequency is a resonance frequency in a resonant circuit including the first capacitor, the pseudo-resonant element, and the inductive load.

5. The power supply system according to claim 1, wherein when an electrostatic capacitance of the first capacitor is set as $C_m$ [F], a synthetic inductance of an inductance of the pseudo-resonant element and an inductance of the inductive load is set as L [H], an electrostatic capacitance of the second capacitor is set as $C_r$ [F], and an angular frequency when a frequency for on and off of the switch is the output frequency is set as $\omega$ [rad/s], a following (A) expression is established:

$$C_m \leq \frac{1}{\omega^2\left(L - \frac{1}{\omega^2 C_r}\right)}. \quad (A)$$

6. The power supply system according to claim 1, further comprising:
a transformer disposed between an output end of the magnetic energy recovery switch, and the pseudo-resonant element and the inductive load,
wherein when an electrostatic capacitance of the first capacitor is set as $C_m$ [F], a synthetic inductance of an inductance of the pseudo-resonant element and an inductance of the inductive load is set as L [H], an electrostatic capacitance of the second capacitor is set as $C_r$ [F], an angular frequency when a frequency for on and off of the switch is the output frequency is set as $\omega$ [rad/s], and a turns ratio which is a value obtained by dividing a number of turns of a primary winding of the transformer by a number of turns of a secondary winding of the transformer is set as n, a following (B) expression is established:

$$C_m \leq \frac{1}{n^2 \omega^2\left(L - \frac{1}{\omega^2 C_r}\right)}. \quad (B)$$

7. The power supply system according to claim 1,
wherein the pseudo-resonant element is constituted of a second capacitor, and
wherein an inductive reactance and an inductance of the pseudo-resonant element are "0" (zero).

8. The power supply system according to claim 1,
wherein the magnetic energy recovery switch further comprises: a first alternating-current terminal; a second alternating-current terminal; a first direct-current terminal; and a second direct-current terminal,
wherein the plurality of switches are four switches of a first switch, a second switch, a third switch, and a fourth switch,
wherein each of the four switches has a positive electrode terminal and a negative electrode terminal,
wherein a conduction state from the negative electrode terminal to the positive electrode terminal of each of the four switches is a state which allows a current to constantly flow,
wherein a conduction state from the positive electrode terminal to the negative electrode terminal of each of the four switches becomes either state of a state which allows a current to flow and a state which does not allow a current to flow, by on and off of the switch by a signal from the control device,
wherein the negative electrode terminal of the first switch and the positive electrode terminal of the second switch are connected to each other, and the positive electrode terminal of the first switch and the positive electrode terminal of the third switch are connected to each other,
wherein the negative electrode terminal of the fourth switch and the negative electrode terminal of the second switch are connected to each other, and the positive electrode terminal of the fourth switch and the negative electrode terminal of the third switch are connected to each other,
wherein the first alternating-current terminal is connected to a connection point of the first switch and the second switch,
wherein the second alternating-current terminal is connected to a connection point of the third switch and the fourth switch,
wherein the first direct-current terminal is connected to the positive electrode terminal of the first switch and the positive electrode terminal of the third switch,
wherein the second direct-current terminal is connected to the negative electrode terminal of the second switch and the negative electrode terminal of the fourth switch,
wherein the first capacitor is connected between the first direct-current terminal and the second direct-terminal,
wherein a direct-current power supply is connected between the first direct-current terminal and the second direct-current terminal,
wherein the inductive load is connected between the first alternating-current terminal and the second alternating-current terminal,
wherein the second capacitor is connected in series with respect to the inductive load between the first alternating-current terminal and the second alternating-current terminal, and
wherein the control device controls a time when a conduction state from the positive electrode terminal to the negative electrode terminal of the first switch and the fourth switch is a state which allows a current to flow and a conduction state from the positive electrode terminal to the negative electrode terminal of the second switch and the third switch is a state which does not allow a current to flow, and a time when a conduction state from the positive electrode terminal to the negative electrode terminal of the first switch and the fourth switch is a state which does not allow a current to flow and a conduction state from the positive electrode terminal to the negative electrode terminal of the second switch and the third switch is a state which allows a current to flow, based on an output frequency set by the frequency setting device.

9. The power supply system according to claim 1,
wherein the magnetic energy recovery switch further comprises: a first rectification element; a second rectification element; a first alternating-current terminal; a second alternating-current terminal; a first direct-current terminal; and a second direct-current terminal,
wherein the first capacitors are two capacitors,
wherein the plurality of switches are two switches of a first switch and a second switch,
wherein each of the two switches has a positive electrode terminal and a negative electrode terminal,
wherein a conduction state from the negative electrode terminal to the positive electrode terminal of each of the two switches is a state which allows a current to constantly flow, wherein a conduction state from the positive electrode terminal to the negative electrode terminal of each of the two switches becomes either state of a state which allows a current to flow and a state which does not allow a current to flow, by on and off of the switch by a signal from the control device, wherein each of the first rectification element and the second rectification element has a positive electrode terminal and a negative electrode terminal, wherein a conduction state from the negative electrode terminal to the positive electrode terminal of each of the first rectification element and the second rectification element is a state which allows a current to constantly flow, wherein a conduction state from the positive electrode terminal to the negative electrode terminal of each of the first rectification element and the second rectification element is a state which does not allow a current to constantly flow, wherein the negative electrode terminal of the first switch and the positive electrode terminal of the second switch are connected to each other, wherein the negative electrode terminal of the first rectification element and the positive electrode terminal of the second rectification element are connected to each other, wherein the positive electrode terminal of the first switch and the positive electrode terminal of the first rectification element are connected to each other, wherein the negative electrode terminal of the second switch and the negative electrode terminal of the second rectification element are connected to each other, wherein one of the two first capacitors is connected between a connection point of the first switch and the first rectification element and a connection point of the first rectification element and the second rectification element, wherein the other of the two first capacitors is connected between a connection point of the second switch and the second rectification element and a connection point of the first rectification element and the second rectification element, wherein the first alternating-current terminal is connected to a connection point of the first switch and the second switch, wherein the second alternating-current terminal is connected to a connection point of the first rectification element and the second rectification element, wherein the first direct-current terminal is connected to the positive electrode terminal of the first switch and the positive electrode terminal of the first rectification element, wherein the second direct-current terminal is connected to the negative electrode terminal of the second switch and the negative electrode terminal of the second rectification element, wherein a direct-current power supply is connected between the first direct-current terminal and the second direct-current terminal, wherein the inductive load is connected between the first alternating-current terminal and the second alternating-current terminal, wherein the second capacitor is connected in series with respect to the inductive load between the first alternating-current terminal and the second alternating-current terminal, and wherein the control device controls a time when a conduction state from the positive electrode terminal to the negative electrode terminal of the first switch is a state which allows a current to flow and a conduction state from the positive electrode terminal to the negative electrode terminal of the second switch is a state which does not allow a current to flow, and a time when a conduction state from the positive electrode terminal to the negative electrode terminal of the first switch is a state which does not allow a current to flow and a conduction state from the positive electrode terminal to the negative electrode terminal of the second switch is a state which allows a current to flow, based on an output frequency set by the frequency setting device.

10. The power supply system according to claim 1, wherein the inductive load includes a coil for induction heating an object to be heated, or at least one object to be heated which is current-heated.

* * * * *